United States Patent
Yamashita et al.

(10) Patent No.: US 8,476,785 B2
(45) Date of Patent: Jul. 2, 2013

(54) POWER SUPPLY APPARATUS FOR VEHICLE AND METHOD OF CONTROLLING POWER SUPPLY APPARATUS FOR VEHICLE

(75) Inventors: Masaharu Yamashita, Toyota (JP); Ippei Yamazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 496 days.

(21) Appl. No.: 12/936,573

(22) PCT Filed: Mar. 30, 2009

(86) PCT No.: PCT/IB2009/005109
§ 371 (c)(1),
(2), (4) Date: Oct. 6, 2010

(87) PCT Pub. No.: WO2009/125265
PCT Pub. Date: Oct. 15, 2009

(65) Prior Publication Data
US 2011/0031805 A1 Feb. 10, 2011

(30) Foreign Application Priority Data

Apr. 7, 2008 (JP) ................................. 2008-099203

(51) Int. Cl.
*B60L 1/00* (2006.01)
(52) U.S. Cl.
USPC .......................................................... 307/9.1
(58) Field of Classification Search
USPC .......................................................... 307/9.1
See application file for complete search history.

(56) References Cited

U.S. PATENT DOCUMENTS

| 6,034,507 A | 3/2000 | Ikawa et al. |
| RE37,678 E | 4/2002 | Ikawa et al. |
| 2007/0104468 A1 | 5/2007 | Ueno et al. |

FOREIGN PATENT DOCUMENTS

| EP | 1 783 032 | 5/2007 |
| JP | 2003 230269 | 8/2003 |
| JP | 2003 237501 | 8/2003 |
| JP | 2005 335470 | 12/2005 |
| JP | 2006 33966 | 2/2006 |
| JP | 2007 91122 | 4/2007 |
| JP | 2007 237856 | 9/2007 |
| WO | 2006 132052 | 12/2006 |

OTHER PUBLICATIONS

International Search Report issued Sep. 28, 2009 in PCT/IB09/05109 filed Mar. 30, 2009.
Office Action issued Dec. 21, 2009, in Japanese Patent Application No. 2008-099203, filed Apr. 7, 2008, (with partial English translation).

*Primary Examiner* — Robert L. Deberadinis
(74) *Attorney, Agent, or Firm* — Oblon, Spivak, McClelland, Maier & Neustadt, L.L.P.

(57) ABSTRACT

When a change in an output voltage of a main power supply is a decrease, and a degree of the decrease is larger than a reference value, a power supply control portion decreases a boosted voltage of a voltage-boosting circuit according to the degree of the decrease. When the change in the output voltage of the main power supply is an increase, and a degree of the increase is larger than the reference value, the power supply control portion increases the boosted voltage of the voltage-boosting circuit according to the degree of the increase.

11 Claims, 7 Drawing Sheets

POWER SUPPLY APPARATUS FOR VEHICLE AND METHOD OF CONTROLLING POWER SUPPLY APPARATUS FOR VEHICLE

BACKGROUND OF THE INVENTION

1. Field of the Invention

The invention relates to a power supply apparatus for a vehicle, which includes a main power supply that supplies electric power to a plurality of vehicle-mounted electric loads, and a subsidiary power supply charged with the electric power output from the main power supply, and a method of controlling the power supply apparatus.

2. Description of the Related Art

For example, an electric power steering apparatus generally includes an electric motor that provides steering assist torque to the turning operation of a steering wheel. The steering assist torque is adjusted by controlling the feeding of electric power to the electric motor. Such an electric power steering apparatus uses a vehicle-mounted battery as a power source, and consumes large electric power. Therefore, for example, an apparatus proposed in Japanese Patent Application Publication No. 2007-91122 (JP-A-2007-91122) includes a subsidiary power supply that assists the vehicle-mounted battery. The subsidiary power supply is connected in parallel to a power supply line that extends from the vehicle-mounted battery (hereinafter, referred to as "main power supply") to a motor drive circuit. The subsidiary power supply is charged with the electric power output from the main power supply. The subsidiary power supply supplies the electric power to the motor drive circuit using the electric power with which the subsidiary power supply is charged. The apparatus proposed in the publication No. 2007-91122 includes a switch that allows and prohibits the feeding of electric power from the subsidiary power supply to the motor drive circuit; and a switch that allows and prohibits charging of the subsidiary power supply with the electric power output from the main power supply.

However, in the apparatus proposed in the publication No. 2007-91122, when a target value of electric power used to operate the electric motor exceeds a threshold value, the switch is simply turned on to form a power supply circuit that connects the subsidiary power supply to the motor drive circuit. Therefore, it is not possible to appropriately supply the electric power from the subsidiary power supply to the motor drive circuit. That is, because the subsidiary power supply assists the supply of the electric power according to balance between the voltage of the main power supply and the voltage of the subsidiary power supply, sufficient electric power may not be supplied from the subsidiary power supply to the motor drive circuit until the voltage of the main power supply is greatly decreased.

Therefore, when the electric power steering apparatus is operated using a large output, the subsidiary power supply assists the supply of the electric power to the motor drive circuit late. As a result, the voltage of the main power supply is greatly decreased, and a vehicle-mounted lighting device, such as a headlight, flickers, and accordingly, a drive feels discomfort.

SUMMARY OF THE INVENTION

A first aspect of the invention relates to a power supply apparatus for a vehicle. The power supply apparatus includes a main power supply that supplies electric power to a plurality of vehicle-mounted electric loads; a voltage-boosting circuit that boosts an output voltage of the main power supply, and outputs the electric power, whose voltage is boosted, to a specific vehicle-mounted electric load among the plurality of the vehicle-mounted electric loads; a subsidiary power supply that is connected in parallel to a circuit that connects the voltage-boosting circuit to the specific vehicle-mounted electric load, wherein the subsidiary power supply is charged with the electric power output from the voltage-boosting circuit, and the subsidiary power supply assists supply of the electric power to the specific vehicle-mounted electric load using the electric power with which the subsidiary power supply is charged; a power supply change detection portion that detects a change in a state of the supply of the electric power from the main power supply; and a boosted-voltage control portion that controls the boosted voltage of the voltage-boosting circuit, based on the change in the state of the supply of the electric power detected by the power supply change detection portion.

According to the first aspect, the output voltage of the main power supply is boosted by the voltage-boosting circuit, and the electric power whose voltage is boosted is supplied to the specific vehicle-mounted electric load. The subsidiary power supply is connected to the power supply circuit that supplies the electric power from the voltage-boosting circuit to the specific vehicle-mounted electric load. The subsidiary power supply is charged with the electric power output from the voltage-boosting circuit. The subsidiary power supply assists the supply of the electric power from the main power supply, by supplying the electric power, with which the subsidiary power supply is charged, to the specific vehicle-mounted electric load.

In this case, the power supply that supplies the electric power to the specific vehicle-mounted electric load is naturally changed according to balance between the boosted voltage of the voltage-boosting circuit and the output voltage of the subsidiary power supply (power supply voltage) (i.e., according to the magnitude relation between the voltages). That is, when the boosted voltage of the voltage-boosting circuit is higher than the output voltage of the subsidiary power supply, the output from the voltage-boosting circuit is supplied to the specific vehicle-mounted electric load. When the boosted voltage of the voltage-boosting circuit is lower than the output voltage of the subsidiary power supply, the output from the subsidiary power supply is supplied to the specific vehicle-mounted electric load. Also, when the boosted voltage of the voltage-boosting circuit is higher than the output voltage of the subsidiary power supply, the subsidiary power supply is charged.

When large electric power is consumed due to operation of the specific vehicle-mounted electric load, the state of the supply of the electric power from the main power supply is changed. Accordingly, the operations of the other vehicle-mounted electric loads are affected by the change in the state of the supply of the electric power. Accordingly, in the first aspect, the power supply change detection portion detects the change in the state of the supply of the electric power from the main power supply, and the boosted-voltage control portion controls the boosted voltage of the voltage-boosting circuit, based on the changed in the state of the supply of the electric power detected by the power supply change detection portion. Thus, it is possible to switch between charging and discharging of the subsidiary power supply by controlling the boosted voltage of the voltage-boosting circuit. Accordingly, it is possible to suppress a change in the state of the supply of the electric power from the main power supply.

For example, when the amount of the electric power that needs to be supplied from the main power supply is sharply increased, the boosted voltage of the voltage-boosting circuit is decreased so that the electric power is reliably supplied from the subsidiary power supply to the specific vehicle-mounted electric load. Thus, it is possible to reduce the burden of the main power supply, and to suppress a sharp decrease in the output voltage of the main power supply. When the amount of the electric power that needs to be supplied from the main power supply is sharply decreased, the boosted voltage of the voltage-boosting circuit is increased so that the subsidiary power supply is charged with the electric power output from the main power supply, and the electric power is supplied from the main power supply to the specific vehicle-mounted electric load. Thus, it is possible to suppress a sharp increase in the output voltage of the main power supply.

As a result, according to the first aspect, when the specific vehicle-mounted electric load, which consumes a large amount of electric power, is operated, it is possible to reduce an influence on the other vehicle-mounted electric loads.

In the first aspect, the power supply change detection portion may detects a degree of a change in the output voltage of the main power supply; and the boosted-voltage control portion may decrease the boosted voltage of the voltage-boosting circuit, when the change in the output voltage of the main power supply is a decrease in the output voltage of the main power supply, and a degree of the decrease is larger than a decrease threshold value.

In the above-described configuration, the power supply change detection portion detects the change in the state of the supply of the electric power from the main power supply, by detecting the degree of the change in the output voltage of the main power supply. The degree of the change in the output voltage may be indicated by the change value by which the output voltage changes per unit time, that is, the value obtained by differentiating the output voltage with respect to time. Accordingly, it is possible to easily detect the change in the state of the supply of the electric power. When the change in the output voltage is the decrease in the output voltage (i.e., when the output voltage decreases with time), and the degree of the decrease is larger than the degrease threshold value, the boosted-voltage control portion decreases the boosted voltage of the voltage-boosting circuit. Thus, the output voltage of the subsidiary power supply is made higher than the boosted voltage of the voltage-boosting circuit, and the electric power is quickly supplied from the subsidiary power supply to the specific vehicle-mounted electric load. As a result, it is possible to suppress a decrease in the voltage of the main power supply, and to reduce an influence on the other vehicle-mounted electric loads.

In the first aspect, the boosted-voltage control portion may increase the boosted voltage of the voltage-boosting circuit, when the change in the output voltage of the main power supply is an increase in the output voltage of the main power supply, and a degree of the increase is larger than an increase threshold value.

Thus, the boosted voltage of the voltage-boosting circuit is made higher than the output voltage of the subsidiary power supply, and the subsidiary power supply is quickly charged with the electric power output from the main power supply, and the electric power is quickly supplied from the main power supply to the specific vehicle-mounted electric load. Accordingly, it is possible to suppress an increase in the voltage of the main power supply.

As a result, according to the first aspect, when the specific vehicle-mounted electric load is operated, it is possible to suppress a change in the output voltage of the main power supply, and to reduce an influence on the other vehicle-mounted electric loads.

In the first aspect, the boosted-voltage control portion may use a voltage equivalent to an output voltage of the subsidiary power supply as a reference voltage; when the degree of the decrease is larger than the decrease threshold value, the boosted-voltage control portion may decrease the boosted voltage of the voltage-boosting circuit to a value lower than the reference voltage; and when the degree of the increase is larger than the increase threshold value, the boosted-voltage control portion may increase the boosted voltage of the voltage-boosting circuit to a value higher than the reference voltage.

In the above-described configuration, the voltage equivalent to the output voltage of the subsidiary power supply is used as the reference voltage, and the boosted voltage of the voltage-boosting circuit is decreased to a value lower than the reference voltage, or increased to a value higher than the reference voltage. Accordingly, it is possible to reliably change the magnitude relation between the boosted voltage of the voltage-boosting circuit and the output voltage of the subsidiary power supply. Thus, it is possible to more appropriately suppress a change in the output voltage of the main power supply, and to reduce an influence on the other vehicle-mounted electric loads.

In the first aspect, when the degree of the decrease exceeds the decrease threshold value, the boosted-voltage control portion may set a target boosted voltage so that the target voltage decreases as the degree of the decrease increases; and when the degree of the increase exceeds the increase threshold value, the boosted-voltage control portion may set the target boosted voltage so that the target boosted voltage increases as the degree of the increase increases.

In the above-described configuration, the target boosted voltage is set to decrease as the degree of the decrease increases. The target boosted voltage is set to increase as the degree of the increase increases. Accordingly, the subsidiary power supply is charged with an appropriate amount of electric power, and an appropriate amount of electric power is discharged from the subsidiary power supply, according to the degree of the change in the voltage of the main power supply. Therefore, it is possible to more appropriately suppress a change in the output voltage of the main power supply, and to reduce an influence on the other vehicle-mounted electric loads.

In the first aspect, the power supply apparatus may further include a charge amount detection portion that detects an amount of charge in the subsidiary power supply. When the change in the output voltage of the main power supply is the increase in the output voltage of the main power supply, and the degree of the increases is equal to or smaller than the increase threshold value, the boosted-voltage control portion may control the boosted voltage of the voltage-boosting circuit, based on the amount of charge detected by the charge amount detection portion and a target amount of charge; and when the change in the output voltage of the main power supply is the decrease in the output voltage of the main power supply, and the degree of the decrease is equal to or smaller than the decrease threshold value, the boosted-voltage control portion may control the boosted voltage of the voltage-boosting circuit, based on the amount of charge detected by the charge amount detection portion and the target amount of charge.

In the above-described configuration, the power supply apparatus includes the charge amount detection portion that detects the amount of charge in the subsidiary power supply. When the change in the output voltage of the main power supply is the increase in the output voltage of the main power supply, and the degree of the increases is equal to or smaller than the increase threshold value, the boosted-voltage control portion controls the boosted voltage of the voltage-boosting circuit, based on the amount of charge detected by the charge amount detection portion and the target amount of charge. When the change in the output voltage of the main power supply is the decrease in the output voltage of the main power supply, and the degree of the decrease is equal to or smaller than the decrease threshold value, the boosted-voltage control portion controls the boosted voltage of the voltage-boosting circuit, based on the amount of charge detected by the charge amount detection portion and the target amount of charge. That is, when a change in the output voltage of the main power supply, which influences the other vehicle-mounted electric loads, is not detected, the boosted voltage of the voltage-boosting circuit is controlled so that the detected amount of charge is equal to the target amount of charge.

Switching between charging and discharging of the subsidiary power supply is performed according to balance between the boosted voltage of the voltage-boosting circuit and the output voltage of the subsidiary power supply (i.e., the power supply voltage). Accordingly, in the first aspect, it is possible to appropriately switch between charging and discharging of the subsidiary power supply, by controlling the boosted voltage of the voltage-boosting circuit. Thus, it is possible to maintain a good state of charge of the subsidiary power supply. The target amount of charge may be a predetermined fixed value, or may be changed according to, for example, use conditions.

In the first aspect, the plurality of the vehicle-mounted electric loads, to which the electric power is supplied from the main power supply, may include a lighting device.

In the above-described configuration, when the specific vehicle-mounted electric load is operated, it is possible to suppress flickering of the lighting device. Accordingly, it is possible to prevent the driver from feeling discomfort.

In the first aspect, the specific vehicle-mounted electric load may be a steering actuator that provides a steering force to a wheel according to a steering operation performed by a driver.

In the above-described configuration, the specific vehicle-mounted electric load is the electric actuator of the electric steering apparatus, which provides the steering force to the wheel according to the steering operation performed by the driver. For example, an electric power steering apparatus that adds an assist steering force to the steering force of the driver using an electric actuator, or a steer-by-wire steering apparatus may be employed as the electric steering apparatus. The steer-by-wire steering apparatus steers wheels only by operating an electric actuator, without using the steering force of the driver.

In the electric steering apparatus, large electric power is consumed by the electric actuator (for example, the electric motor). Accordingly, in the first aspect, the power supply apparatus includes the voltage-boosting circuit, and the subsidiary power supply that is charged with the electric power output from the voltage-boosting circuit. When large electric power is consumed by the electric actuator, the subsidiary power supply assists the supply of the electric power. When the subsidiary power supply assists the supply of the electric power, the boosted voltage of the voltage-boosting circuit needs to be lower than the output voltage of the subsidiary power supply. However, in the first aspect, because the boosted voltage of the voltage-boosting circuit is controlled based on the change in the state of the supply of the electric power from the main power supply, it is possible to supply the electric power to the electric actuator from the subsidiary power supply before the output voltage of the main power supply is greatly decreased. As a result, it is possible to appropriately operate the electric steering apparatus, and to appropriately operate the other vehicle-mounted electric loads.

A second aspect of the invention relates to a method of controlling a power supply apparatus for a vehicle. The power supply apparatus includes a main power supply that supplies electric power to a plurality of vehicle-mounted electric loads; a voltage-boosting circuit that boosts an output voltage of the main power supply, and outputs the electric power, whose voltage is boosted, to a specific vehicle-mounted electric load among the plurality of the vehicle-mounted electric loads; and a subsidiary power supply that is connected in parallel to a circuit that connects the main power supply to the specific vehicle-mounted electric load, wherein the subsidiary power supply is charged with the electric power output from the voltage-boosting circuit, and the subsidiary power supply assists supply of the electric power to the specific vehicle-mounted electric load using the electric power with which the subsidiary power supply is charged. The method includes detecting a change in a state of the supply of the electric power from the main power supply; and controlling the boosted voltage of the voltage-boosting circuit, based on the change in the detected state of the supply of the electric power.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
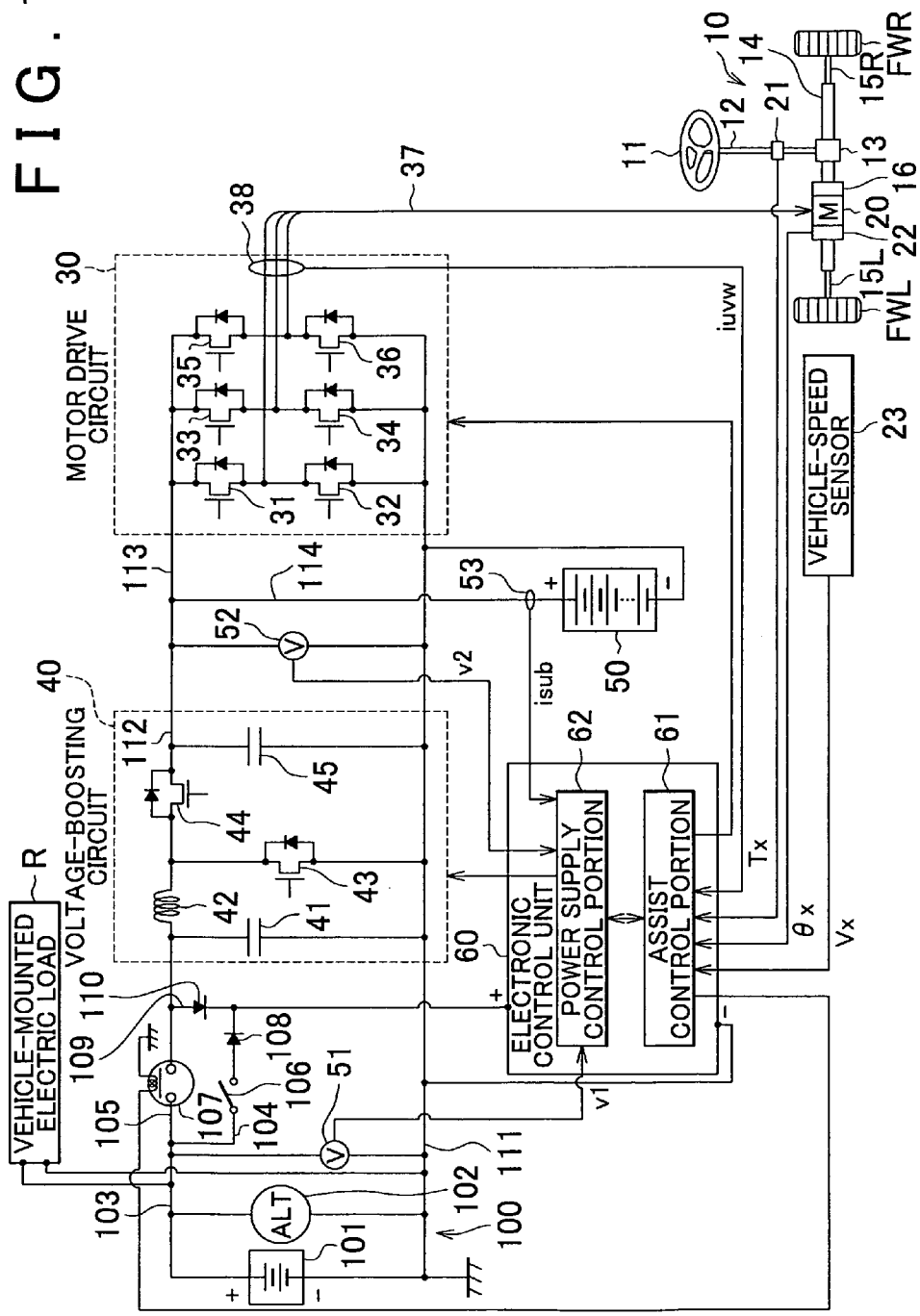
FIG. 1 is a schematic configuration diagram showing an electric power steering apparatus that includes a power supply apparatus according to an embodiment of the invention.

Hereinafter, a power supply apparatus for a vehicle according to an embodiment of the invention will be described with reference to the drawings. FIG. 1 shows a schematic configuration of an electric power steering apparatus that includes a power supply apparatus for a vehicle according to the embodiment of the invention.

The electric power steering apparatus includes a steering mechanism 10, an electric motor 20, a motor drive circuit 30, a voltage-boosting circuit 40, a subsidiary power supply 50, and an electronic control unit 60. The steering mechanism 10 steers steered wheels according to the steering operation of a steering wheel 11. The electric motor 20, fitted to the steering mechanism 10, generates steering assist torque that assists the steering operation. The motor drive circuit 30 drives the electric motor 20. The voltage-boosting circuit 40 boosts an output voltage of a main power supply 100, and supplies the boosted voltage to the motor drive circuit 30. The subsidiary power supply 50 is connected in parallel to a power supply circuit between the voltage-boosting circuit 40 and the motor drive circuit 30. The electronic control unit 60 controls the operation of the electric motor 20 and the operation of the voltage-boosting circuit 40.

The steering mechanism 10 steers right and left front wheels FWR and FWL according to the turning operation of the steering wheel 11. The steering mechanism 10 includes a steering shaft 12. The upper end of the steering shaft 12 is connected to the steering wheel 11 in a manner such that the steering shaft 12 rotates integrally with the steering wheel 11. The lower end of the steering shaft 12 is connected to a pinion gear 13 in a manner such that the pinion gear 13 rotates integrally with the steering shaft 12. The pinion gear 13 engages with rack teeth formed on a rack bar 14. The pinion gear 13 and the rack bar 14 constitute a rack and pinion mechanism. Knuckles (not shown) of the right and left front wheels FWR and FWL are connected to ends of the rack bar 14 via tie rods 15R and 15L. The right and left front wheels FWR and FWL are steered to the right or left according to the displacement of the rack bar 14 in the axial direction of the rack bar 14. The rack bar 14 is displaced in the axial direction of the rack bar 14 according to the rotation of the steering shaft 12 around the axis of the steering shaft 12.

The electric motor 20, which assists the steering operation, is fitted to the rack bar 14. The rotational shaft of the electric motor 20 is connected to the rack bar 14 via a ball screw mechanism 16 so that power is transmitted from the electric motor 20 to the rack bar 14. When the electric motor 20 rotates, the electric motor 20 provides a steering force to the right and left front wheels FWR and FWL to assist the steering operation. The ball screw mechanism 16 functions as a speed reducer, and a rotation-straight movement converter. That is, the ball screw mechanism 16 reduces the speed of the rotation transmitted from the electric motor 20, converts the rotation to straight movement, and transmits the straight movement to the rack bar 14.

A steering torque sensor 21 is provided in the steering shaft 12. The steering torque sensor 21 outputs a signal corresponding to steering torque that is applied to the steering shaft 12 according to the turning operation of the steering wheel 11. Hereinafter, the value of the steering torque, which is detected based on the signal output from the steering torque sensor 21, will be referred to as "steering torque Tx". The direction in which the steering wheel is turned is determined based on whether the steering torque Tx is a positive value or a negative value. In the embodiment, the steering torque Tx when the steering wheel 11 is turned in a clockwise direction is indicated by a positive value. The steering torque Tx when the steering wheel 11 is turned in a counterclockwise direction is indicated by a negative value. Thus, the magnitude of the steering torque Tx is indicated by the magnitude of the absolute value of the steering torque Tx.

A rotational angle sensor 22 is provided in the electric motor 20. The rotational angle sensor 22 is incorporated in the electric motor 20. The rotational angle sensor 22 outputs a detection signal corresponding to the rotational angle position of a rotor of the electric motor 20. The detection signal output from the rotational angle sensor 22 is used for calculations of the rotational angle and rotational angular velocity of the electric motor 20. Because the rotational angle of the electric motor 20 is proportional to the steering angle of the steering wheel 11, the rotational angle of the electric motor 20 is also used as the steering angle of the steering wheel 11. The rotational angular velocity of the electric motor 20, which is obtained by differentiating the rotational angle of the electric motor 20 with respect to time, is proportional to the steering angular velocity of the steering wheel 11. Therefore, the rotational angular velocity of the electric motor 20 is also used as the steering velocity of the steering wheel 11. Hereinafter, the value of the steering angle of the steering wheel 11 detected based on the signal output from the rotational angle sensor 22 will be referred to as "steering angle $\theta x$", and the value of the steering angular velocity of the steering wheel 11, which is obtained by differentiating the steering angle $\theta x$ with respect to time, will be referred to as "steering velocity $\omega x$". The steering angle $\theta x$ in the clockwise direction or the counterclockwise direction with respect to the neutral position of the steering wheel 11 is indicated by the positive value or the negative value of the steering angle $\theta x$. In the embodiment, when the steering wheel 11 is at the neutral position, the steering angle $\theta x$ is "0". The steering angle in the clockwise direction with respect to the neutral position is indicated by a positive value. The steering angle in the counterclockwise direction with respect to the neutral position is indicated by a negative value.

The motor drive circuit 30 is a three-phase inverter circuit configured using six switching elements 31 to 36. Each of the switching elements 31 to 36 includes a metal-oxide semiconductor field-effect transistor (MOSFET). More specifically, a circuit formed by connecting the first switching element 31 to the second switching element 32 in series, a circuit formed by connecting the third switching element 33 to the fourth switching element 34 in series, and a circuit formed by connecting the fifth switching element 35 to the sixth switching element 36 in series are connected in parallel. A power supply line 37 extends from a portion between the two switching elements in each series circuit to the electric motor 20 (that is, the power supply lines 37 extend from the portion between the first switching element 31 and the second switching element 32, the portion between the third switching element 33 and the fourth switching element 34, and the portion between the fifth switching element 35 and the sixth switching element 36, to the electric motor 20).

An electric current sensor 38 is provided in the power supply lines 37 extending from the motor drive circuit 30 to the electric motor 20. The electric current sensor 38 detects (measures) the electric current that flows in each phase, and outputs a detection signal corresponding to the detected value of the electric current, to the electronic control unit 60. Hereinafter, the measured value of the electric current will be referred to as "motor current iuvw", and the electric current sensor 38 will be referred to as "motor current sensor 38".

The gate of each of the switching elements 31 to 36 is connected to the assist control portion 61 (described later) of the electronic control unit 60. A duty ratio is controlled based on a pulse width modulation (PWM) control signal output from the assist control portion 61. Thus, the drive voltage for the electric motor 20 is adjusted to a target voltage. As shown by a circuit symbol in FIG. 1, the MOSFET, which constitutes each of the switching elements 31 to 36, is provided with a diode.

Next, the power supply system of the electric power steering apparatus will be described. The power supply apparatus of the electric power steering apparatus includes the main power supply 100; the voltage-boosting circuit 40 that boosts the output voltage of the main power supply 100; the subsidiary power supply 50 connected in parallel to a circuit that connects the voltage-boosting circuit 40 to the motor drive circuit 30; and a power supply control portion 62 that is provided in the electronic control 60, and that controls the boosted voltage of the voltage-boosting circuit 40. The electric motor 20 and the motor drive circuit 30, which receive electric power from the power supply apparatus, function as the specific vehicle-mounted electric load.

The main power supply 100 is configured by connecting a main battery 101 in parallel to an alternator 102. The main battery 101 is an ordinary vehicle-mounted battery. The rated output voltage of the main battery 101 is 12 volts. The alternator 102 generates electric power due to the rotation of the engine. The rated output voltage of the alternator 102 is 14 volts. Accordingly, the main power supply 100 constitutes a vehicle-mounted power supply with a 14-volt system.

The main power supply 100 supplies electric power to the electric power steering apparatus, and the other vehicle-mounted electric loads R such as a headlight that is a lighting device. The power supply terminal (the positive terminal) of the main battery 101 is connected to a power source line 103. The ground terminal of the main battery 101 is connected to a ground line 111. A voltage sensor 51 is provided near the main power supply 100. The voltage sensor 51 detects the output voltage of the main power supply 100 (i.e., the voltage between the power source line 103 and the ground line 111), and outputs a signal corresponding to the detected value. Hereinafter, the voltage sensor 51 will be referred to as "first voltage sensor 51", and the value of the voltage detected by the voltage sensor 51 will be referred to as "main power supply voltage v1".

A control system power supply line 104 and a drive system power supply line 105 extend from the power source line 103. The control system power supply line 104 functions as the power supply line used to supply electric power only to the electronic control unit 60. The drive system power supply line 105 functions as the power supply line used to supply electric power to both of the motor drive circuit 30 and the electronic control unit 60.

The control system power supply line 104 is connected to an ignition switch 106. The drive system power supply line 105 is connected to a power supply relay 107. The power supply relay 107 is turned on according to a control signal output from the assist control portion 61 of the electronic control unit 60 to form a power supply circuit that supplies electric power to the electric motor 20. The control system power supply line 104 is connected to the power supply positive terminal of the electronic control unit 60. A diode 108 is provided on the control system power supply line 104 at a position between the ignition switch 106 and the load (i.e., the electronic control unit 60). The cathode of the diode 108 is directed toward the electronic control unit 60, and the anode of the diode 108 is directed toward the main power supply 100. The diode 108 allows electric current to flow only in the direction in which the electric power is supplied. That is, the diode 108 is a back-flow prevention element.

A connection line 109, which is connected to the control system power supply line 104, extends from a portion of the drive system power supply line 105, which is located between the power supply relay 107 and the load. The connection line 109 is connected to a portion of the control system power supply line 104, which is located between the electronic control unit 60 and a position at which the diode 108 is connected to the control system power supply line 104. A diode 110 is connected to the connection line 109. The cathode of the diode 110 is directed toward the control system power supply line 104. The anode of the diode 110 is directed toward the drive system power supply line 105. Thus, the circuit is configured in a manner such that electric power is supplied from the drive system power supply line 105 to the control system power supply line 104 via the connection line 109, however, electric power is not supplied from the control system power supply line 104 to the drive system power supply line 105. The drive system power supply line 105 and the ground line 111 are connected to the voltage-boosting circuit 40. The ground line 111 is also connected to the ground terminal of the electronic control unit 60.

The voltage-boosting circuit 40 includes a capacitor 41, a voltage-boosting coil 42, a first voltage-boosting switching element 43, a second voltage-boosting switching element 44, and a capacitor 45. The capacitor 41 is provided between the drive system power supply line 105 and the ground line 111. The voltage-boosting coil 42 is provided in series with the drive system power supply line 105 at a position between the load and a point at which the capacitor 41 is connected to the drive system power supply line 105. The first voltage-boosting switching element 43 is provided between the ground line 111 and a portion of the drive system power supply line 105, which is located between the voltage-boosting coil 42 and the load. The second voltage-boosting switching element 44 is provided in series with the drive system power supply line 105 at a position between the load and a point at which the first voltage-boosting switching element 43 is connected to the drive system power supply line 105. The capacitor 45 is provided between the ground line 111 and a portion of the drive system power supply line 105, which is located between the second voltage-boosting switching element 44 and the load. The secondary side of the voltage-boosting circuit 40 is connected to a boosted-voltage power supply line 112.

In the embodiment, the MOSFET is used as each of the voltage-boosting switching elements 43 and 44. However, other switching elements may be used as each of the voltage-boosting switching elements 43 and 44. Also, as shown by the circuit symbol in FIG. 1, the MOSFET, which constitutes each of the voltage-boosting switching elements 43 and 44, is provided with a diode.

The power supply control portion 62 (described later) of the electronic control unit 60 controls the boosted voltage of the voltage-boosting circuit 40. The power supply control portion 62 outputs a pulse signal with a predetermined cycle to the gate of each of the first and second voltage-boosting switching elements 43 and 44 to turn on/off each of the first and second voltage-boosting switching elements 43 and 44 so that the voltage of the electric power supplied from the main power supply 100 is boosted, and a predetermined output voltage is generated on the boosted-voltage power supply line 112. In this case, the first and second voltage-boosting switching elements 43 and 44 are controlled in a manner such that when the first voltage-boosting switching element 43 is on, the second voltage-boosting switching element 44 is off, and when the first voltage-boosting switching element 43 is off, the second voltage-boosting switching element 44 is on. More specifically, in the voltage-boosting circuit 40, the first voltage-boosting switching element 43 is turned on, and the second voltage-boosting switching element 44 is turned off so that electric current is supplied to the voltage-boosting coil 42 for only a short time period, and electric power is stored in the voltage-boosting coil 42, and then, the first voltage-boosting switching element 43 is turned off and the second voltage-boosting switching element 44 is turned on so that the electric power stored in the voltage-boosting coil 42 is output.

The output voltage of the second voltage-boosting switching element 44 is smoothed by the capacitor 45. Accordingly, the stable electric power whose voltage is boosted is output from the boosted-voltage power supply line 112. In this case, a plurality of capacitors with different frequency characteristics may be connected in parallel to each other, to improve the smoothing characteristic. Also, the capacitor 41, which is provided at the input side of the voltage-boosting circuit 40, removes noise transferred toward the main power supply 100.

The boosted voltage (i.e., the output voltage) of the voltage-boosting circuit 40 is adjusted by controlling the duty ratio of each of the first and the second voltage-boosting switching elements 43 and 44 (i.e., by executing the PWM control for each of the first and the second voltage-boosting switching elements 43 and 44). As the on-duty ratio of the second voltage-boosting switching element 44 (i.e., the ratio of a time period during which the second voltage-boosting switching element 44 is on) increases, the boosted voltage increases. For example, the voltage-boosting circuit 40 according to the embodiment is configured so that the boosted voltage is adjusted in a range of 20 volts to 50 volts. A general purpose DC-DC converter may be used as the voltage-boosting circuit 40.

A boosted-voltage drive line 113 and a charge/discharge line 114 extend from the boosted-voltage power supply line 112. The boosted-voltage drive line 113 is connected to the power input portion of the motor drive circuit 30. The charge/discharge line 114 is connected to the positive terminal of the subsidiary power supply 50.

The subsidiary power supply 50 is charged with the electric power output from the voltage-boosting circuit 40. The subsidiary power supply 50 is an electric power storage device that assists the main power supply 100, and supplies the electric power to the motor drive circuit 30, when the motor drive circuit 30 needs large electric power. Accordingly, the subsidiary power supply 50 is configured by connecting a plurality of power storage cells in series so that the voltage equivalent to the boosted voltage of the voltage-boosting circuit 40 can be maintained. The ground terminal of the subsidiary power supply 50 is connected to the ground line 111. As the subsidiary power supply, for example, a capacitor (electric double layer capacitor) may be used.

A voltage sensor 52 is provided at the output side of the voltage-boosting circuit 40. The voltage sensor 52 detects a voltage between the boosted-voltage power supply line 112 and the ground line 111, and outputs a signal corresponding to the detected value to the power supply control portion 62. In the circuit configuration, the charge/discharge line 114 is connected to the boosted-voltage power supply line 112. Therefore, the value measured by the voltage sensor 52 is one of the output voltage (i.e., the boosted voltage) of the voltage-boosting circuit 40 and the output voltage of the subsidiary power supply 50 (i.e., the power supply voltage), which is higher than the other. Hereinafter, the voltage sensor 52 will be referred to as "second voltage sensor 52", and the value of the voltage detected by the second voltage sensor 5 will be referred to as "output voltage v2".

A current sensor 53 is provided on the charge/discharge line 114. The current sensor 53 detects the electric current that flows to/from the subsidiary power supply 50. The current sensor 53 is connected to the power supply control portion 62 of the electronic control unit 60. The current sensor 53 outputs a signal indicating a charge/discharge current isub, which is a measured value, to the power supply control portion 62. The current sensor 53 determines the direction in which the electric current flows, that is, distinguishes between a charge current that flows from the voltage-boosting circuit 40 to the subsidiary power supply 50, and a discharge current that flows from the subsidiary power supply 50 to the motor drive circuit 30. The current sensor 53 measures the magnitude of each of the charge current and the discharge current. When the charge current flows, the charge/discharge current isub is indicated by a positive value. When the discharge current flows, the charge/discharge current isub is indicated by a negative value. Hereinafter, the current sensor 53 will be referred to as "charge/discharge current sensor 53", and the value of the electric current detected by the current sensor 53 will be referred to as "charge/discharge current isub".

The electronic control unit 60 includes a microcomputer that includes a CPU, a ROM, and a RAM. The electronic control unit 60 is divided into the assist control portion 61 and the power supply control portion 62, based on the respective functions. The assist control portion 61 is connected to the steering torque sensor 21, the rotational angle sensor 22, the motor current sensor 38, and a vehicle-speed sensor 23. Thus, the assist control portion 61 receives sensor signals that indicate the steering torque Tx, the steering angle θx, the motor current iuvw, and a vehicle speed Vx. Based on the sensor signals, the assist control portion 61 outputs the PWM control signal to the motor drive circuit 30 to control the operation of the electric motor 20, thereby assisting the steering operation performed by the driver.

The power supply control portion 62 controls the charging/discharging of the subsidiary power supply 50 by controlling the boosted voltage of the voltage-boosting circuit 40. The power supply control portion 62 is connected to the first voltage sensor 51, the second voltage sensor 52, and the charge/discharge current sensor 53. The power supply control portion 62 receives the sensor signals output from the sensors. Signals are transmitted between the power supply control portion 62 and the assist control portion 61. The power supply control portion 62 outputs the PWM control signal to the voltage-boosting circuit 40 based on the sensor signals input to the power supply control portion 62 and the sensor signals input to the assist control portion 61. The boosted voltage of the voltage-boosting circuit 40, that is, the output voltage of the voltage-boosting circuit 40 is changed by controlling the duty ratio of each of the first and second voltage-boosting switching elements 43 and 44 according to the PWM control signal input to the voltage-boosting circuit 40.

Figure 2:
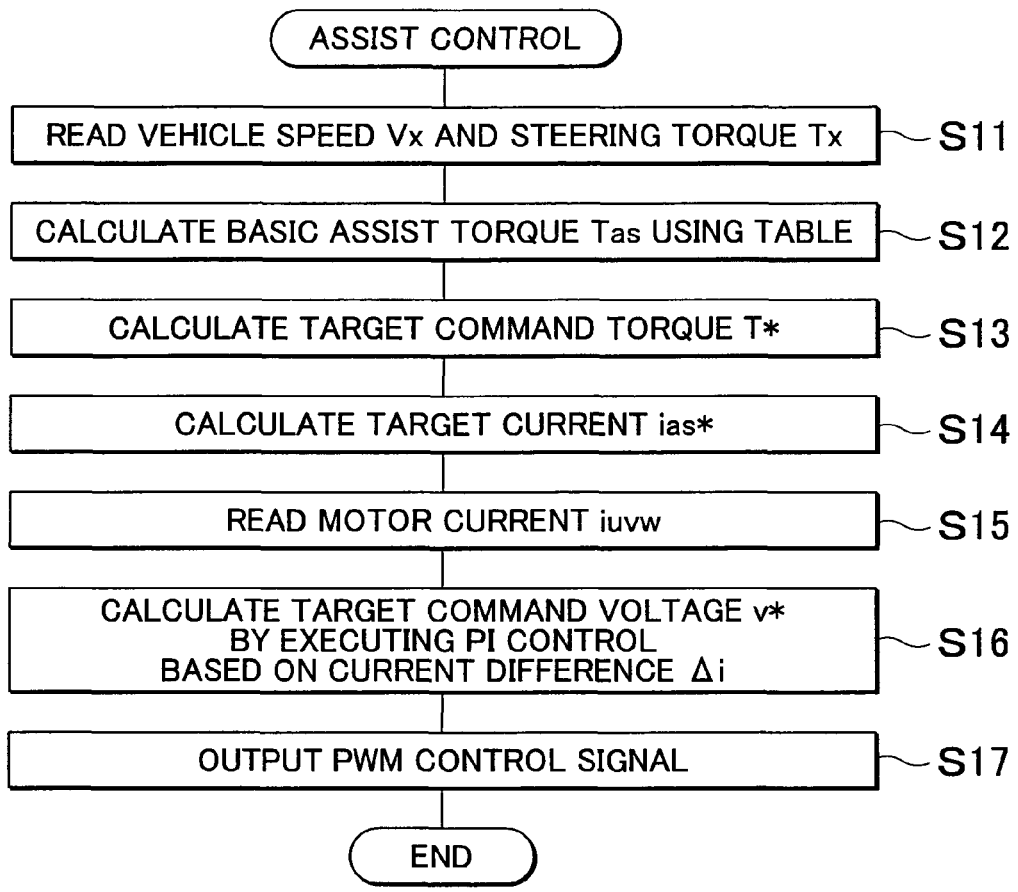
FIG. 2 is a flowchart showing a steering assist control routine.

Next, a steering assist control executed by the assist control portion 61 of the electronic control unit 60 will be described. FIG. 2 shows a steering assist control routine executed by the assist control portion 61. The steering assist control routine in the form of a control program is stored in the ROM of the electronic control unit 60. When the ignition switch 106 is turned on, the steering assist control routine is started. The steering assist control routine is executed in a predetermined short cycle, and repeatedly executed.

When the control routine is started, the assist control portion 61 reads the vehicle speed Vx detected by the vehicle-speed sensor 23, and the steering torque Tx detected by the steering torque sensor 21, in step S11.

Figure 3:
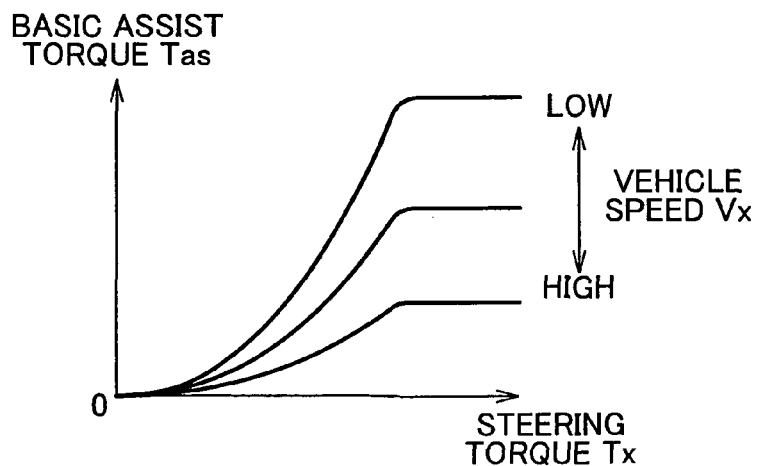
FIG. 3 is a graph showing an assist torque table.

Subsequently, in step S12, the assist control portion 61 calculates basic assist torque Tas that is set based on the input vehicle speed Vx and the input steering torque Tx with reference to an assist torque table shown in FIG. 3. The assist torque table is stored in the ROM of the electronic control unit 60. The assist torque table is set so that as the steering torque Tx increases, the basic assist torque Tas increases. Further, the assist torque table is set so that as the vehicle speed Vx decreases, the basic assist torque Tas increases. The assist torque table in FIG. 3 shows the characteristic of the basic assist torque Tas with respect to the steering torque Tx when the steering wheel 11 is turned in the clockwise direction. When the steering wheel 11 is turned in the counterclockwise direction, the basic assist torque Tas changes with respect to the absolute value of the steering torque Tx in the same manner as the manner shown in FIG. 3.

Subsequently, in step S13, the assist control portion 61 calculates a target command torque T* by adding compensation torque to the basic assist torque Tas. For example, the compensation torque is calculated by summing a returning force of the steering shaft 12 toward an original position, and returning torque corresponding to a resisting force that resists the rotational force of the steering shaft 12. The returning force increases in proportion to the steering angle θx. The resisting force increases in proportion to the steering velocity ωx. When the compensation torque is calculated, the rotational angle of the electric motor 20 (equivalent to the steering angle θx of the steering wheel 11) detected by the rotational angle sensor 22 and input to the assist torque control portion 61 is used. The steering velocity ωx is obtained by differentiating the steering angle θx of the steering wheel 11 with respect to time.

Subsequently, in step S14, the assist control portion 61 calculates a target current ias* that changes in proportion to the target command torque T*. The target current ias* is obtained by dividing the target command torque T* by a torque constant.

Subsequently, in step S15, the assist control portion 61 reads the motor current iuvw that flows to the electric motor 20, from the motor current sensor 38. Subsequently, in step S16, the assist control portion 61 calculates a difference Δi between the motor current iuvw and the target current ias* calculated in step S14. Then, the assist control portion 61 calculates a target command voltage v* by executing a proportional integral (PI) control based on the difference Δi.

Then, in step S17, the assist control portion 61 outputs the PWM control signal corresponding to the target command voltage v* to the motor drive circuit 30, and then, the control routine ends. The control routine is executed in the predetermined short cycle, and repeatedly executed. Thus, the duty ratio of each of the switching elements 31 to 36 in the motor drive circuit 30 is controlled by executing the control routine. Accordingly, it is possible to obtain desired assist torque according to the steering operation performed by the driver.

During the steering assist control, large electric power is required, particularly when the steering wheel 11 is operated while the vehicle is stopped, or the vehicle travels at a low speed. However, it is not desirable that the capacity of the main power supply 100 should be made large to prepare for temporary consumption of large electric power. Accordingly, in the electric power steering apparatus in the embodiment, the capacity of the main power supply 100 is not made large, and the subsidiary power supply 50 is provided. The subsidiary power supply 50 assists the supply of electric power when large electric power is temporarily consumed. Also, in the electric power steering apparatus in the embodiment, the voltage-boosting circuit 40 is provided to efficiently drive the electric motor 20. Thus, the system, in which the electric power whose voltage is boosted is supplied to the motor drive circuit 30 and the subsidiary power supply 50, is configured.

When the power supply system is configured, the sufficient performance (the sufficient assist performance) of the electric power steering apparatus is provided by using both of the main power supply 100 and the subsidiary power supply 50. Therefore, it is necessary to appropriately maintain the subsidiary power supply 50 in a good state to provide the sufficient assist performance. If the subsidiary power supply 50 is overcharged, or charging and discharging of the subsidiary power supply 50 are repeatedly performed, the subsidiary power supply 50 quickly deteriorates, and the lifetime of the subsidiary power supply 50 is shortened. Also, when the amount of charge in the subsidiary power supply 50 is insufficient, the sufficient assist performance is not provided.

Accordingly, the power supply control portion 62 of the electronic control unit 60 controls charging/discharging (charging and discharging) of the subsidiary power supply 50 by controlling the boosted voltage using the voltage-boosting circuit 40. Thus, the power supply control portion 62 maintains the subsidiary power supply 50 in the best possible state.

If the subsidiary power supply 50 assists the supply of electric power late when large electric power is consumed due to the operation of the electric power steering, large electric power is output from the main power supply 100. Accordingly, the output voltage of the main power supply 10 is temporarily greatly decreased. Therefore, the electric power is temporarily poorly supplied to the other vehicle-mounted electric loads R. For example, a headlight flickers, and a driver feels discomfort.

Accordingly, in view of the problem, the power supply control portion 62 of the electronic control unit 60 suppresses the change in the output voltage of the main power supply 100, and reduces unstable operation of the other vehicle-mounted electric loads R, by controlling the boosted voltage of the voltage-boosting circuit 40.

Figure 4:
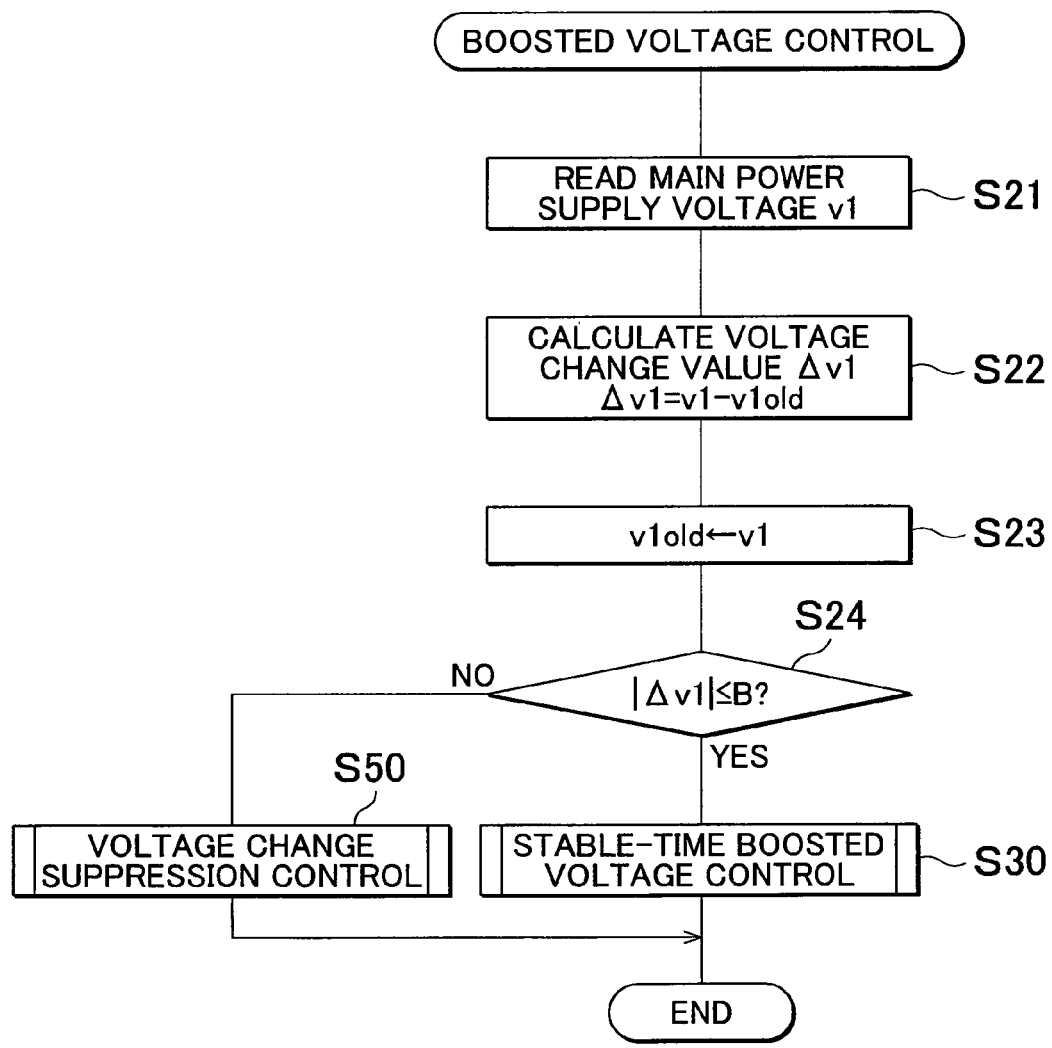
FIG. 4 is a flowchart showing a boosted voltage control routine.

Hereinafter, a boosted voltage control executed by the power supply control portion 62 of the electronic control unit 60 will be described. FIG. 4 shows the boosted voltage control routine executed by the power supply control portion 62. The boosted voltage control routine in the form of a control program is stored in the ROM of the electronic control unit 60. When the ignition switch 106 is turned on, the boosted voltage control routine is started. The boosted voltage control routine is executed in a predetermined short cycle, and repeatedly executed.

When the control routine is started, in step S21, the power supply control portion 62 reads the main power supply voltage v1 detected by the first voltage sensor 51. Subsequently, in step S22, the power supply control portion 62 calculates a voltage change value Δv1 by which the main power supply voltage v1 changes. Because the control routine is executed in the predetermined cycle, and repeatedly executed, the power supply control portion 62 determines a difference (v1−v1old) between the main power supply voltage v1old detected in step S21 in an immediately preceding cycle (one cycle earlier) and the main power supply voltage v1 detected in step S21 in the current cycle, and regards the difference as the voltage change value Δv1. The voltage change value Δv1 is a value by which the main power supply voltage v1 changes per unit time, that is, a value obtained by differentiating the main power supply voltage v1 with respect to time. The voltage change value Δv1 need not necessarily be calculated by determining a change in the main power supply voltage v1 in one control cycle. The voltage change value Δv1 may be calculated by determining a change in the main power supply voltage v1 in a plurality of control cycles.

Subsequently, in step S23, the power supply control portion 62 stores the main power supply voltage v1 detected in the current cycle in the RAM as the main power supply voltage v1old. Accordingly, the main power supply voltage v1 detected in the current cycle is used as the main power supply voltage v1old in step S22 in the next cycle (one cycle later).

Subsequently, in step S24, the power supply control portion 62 determines whether the absolute value (|Δv1|) of the voltage change value Δv1 is equal to or smaller than a reference value B (a positive value). The reference value B is regarded as a decrease threshold value and an increase threshold value in the embodiment. When the voltage change value Δv1 is larger than the reference value B, it is determined that the main power supply voltage v1 increases by a value larger than the increase threshold value. When the voltage change value Δv1 is smaller than the reference value (−B), it is determined that the main power supply voltage v1 decreases by a value larger than the decrease threshold value.

When the power supply control portion 62 determines that the absolute value of the voltage change value Δv1 is equal to or smaller than the reference value B (YES in step S24), the power supply control portion 62 executes a stable-time boosted voltage control. When the power supply control portion 62 determines that the absolute value of the voltage change value Δv1 is larger than the reference value B (NO in step S24), the power supply control portion 62 executes a voltage change suppression control. The stable-time boosted voltage control and the voltage change suppression control will be described with reference to flowcharts in FIG. 5 and FIG. 8. After the stable-time boosted voltage control routine or the voltage change suppression control is executed, the boosted voltage control routine ends. Then, the routine is executed in the predetermined cycle, and repeatedly executed.

Figure 5:
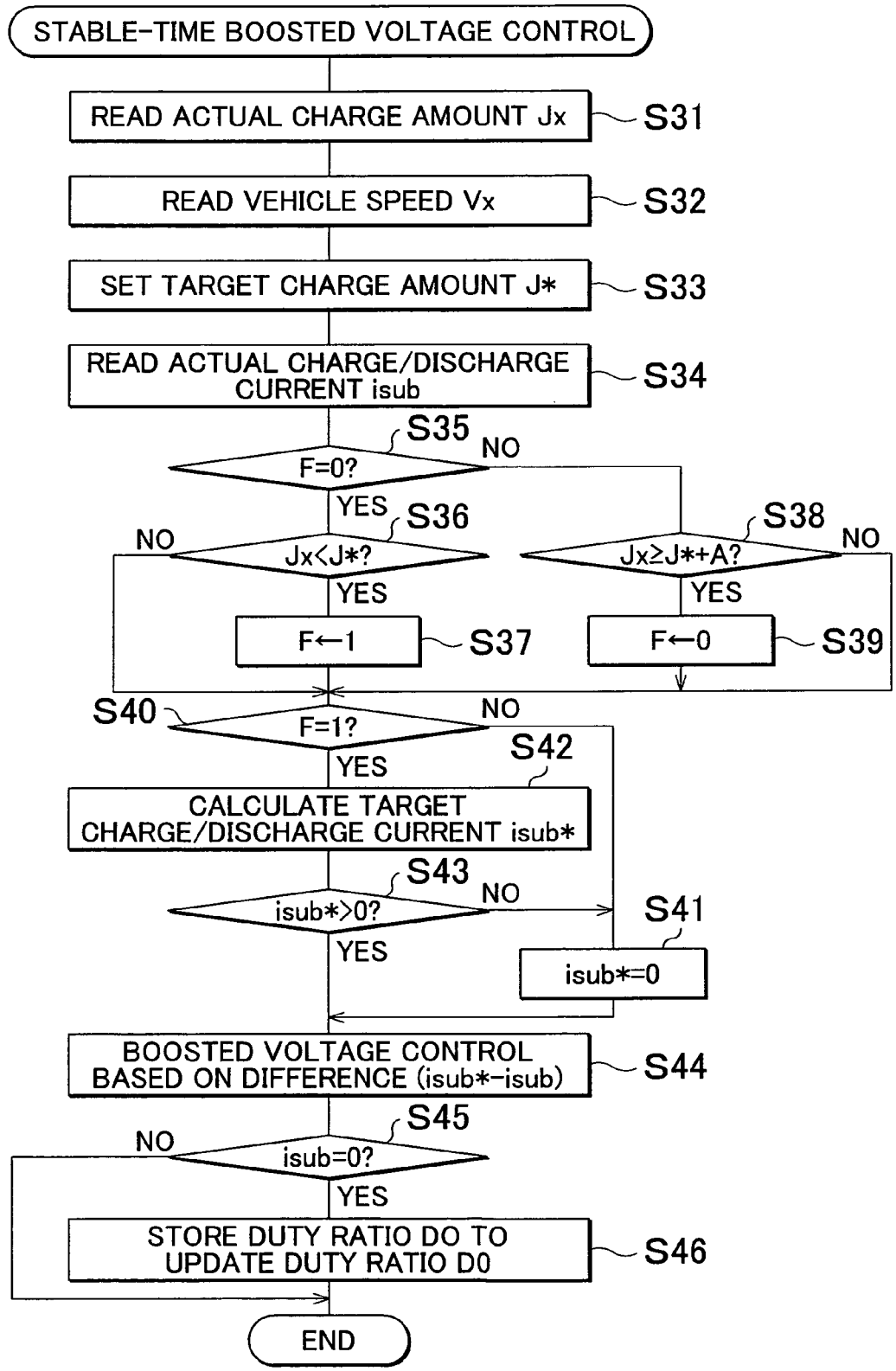
FIG. 5 is a flowchart showing a stable-time boosted voltage control routine.

The stable-time boosted voltage control executed in step S30 will be described. FIG. 5 is a flowchart showing the stable-time boosted voltage control routine. In the stable-time boosted voltage control routine, first, in step S31, the power supply control portion 62 reads an actual charge amount Jx in the subsidiary power supply 50. The actual charge amount Jx is sequentially calculated by an actual charge amount detection routine (FIG. 7) described later. Accordingly, the process in step S31 is the process of reading data indicating the latest actual charge amount Jx calculated by the actual charge amount detection routine.

Figure 6:
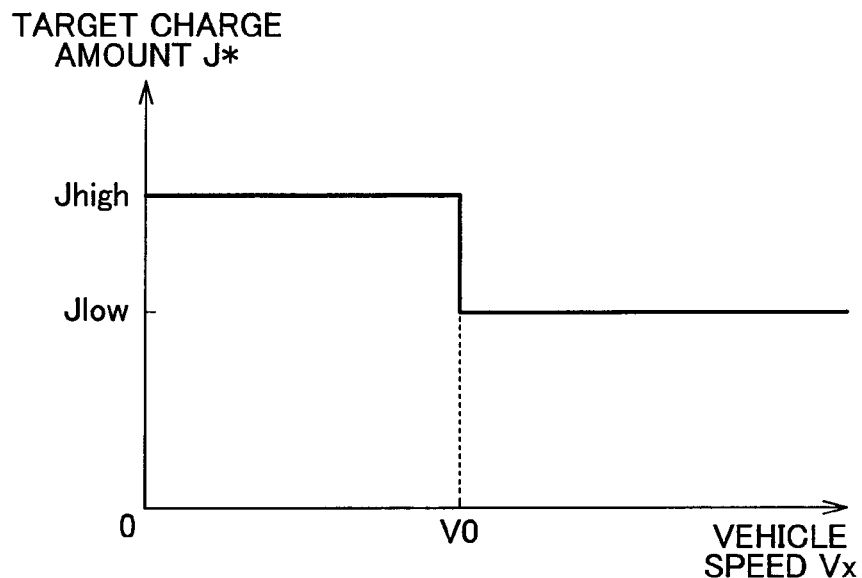
FIG. 6 is a graph showing a relation between a vehicle speed and a target charge amount.

Next, in step S32, the power supply control portion 62 reads the vehicle speed Vx detected by the vehicle-speed sensor 23. Then, in step S33, the power supply control portion 62 sets a target charge amount J* according to the vehicle speed Vx. The target charge amount J* is the optimum charge amount in the subsidiary power supply 50. As shown in FIG. 6, when the vehicle speed Vx is lower than a reference vehicle speed V0, a target charge amount Jhigh is selected. When the vehicle speed Vx is equal to or higher than the reference vehicle speed V0, a target charge amount Jlow, which is smaller than the target charge amount Jhigh, is selected. The subsidiary power supply 50 has a sufficient capacity so that the subsidiary power supply 50 is not overcharged when the amount of charge in the subsidiary power supply 50 is equal to the target charge amount J*.

When the above-described steering assist control is executed, as shown in FIG. 3, as the vehicle speed Vx decreases, the basic assist torque Tas is set to increase, and therefore, the electric power consumed in the motor drive circuit 30 (the electric power consumed to drive the electric motor 20) increases. Thus, in the stable-time boosted voltage control routine, the target charge amount J* is set according to the vehicle speed Vx. In the embodiment, the target charge amount J* is switched between two levels. However, the target charge amount J* may be switched between three or more levels. Also, the target charge amount J* may be set to change continuously according to the vehicle speed. The target charge amount J* may be set in any manner as long as the target charge amount J* decreases as the vehicle speed Vx increases. The target charge amount J* may be a fixed value.

After the power supply control portion 62 sets the target charge amount J*, the power supply control portion 62 reads the actual charge/discharge current isub detected by the charge/discharge current sensor 53 in step S34. Next, in step S35, the power supply control portion 62 determines whether the value of the flag F is "0". The flag F indicates whether the state of charge of the subsidiary power supply 50 is sufficient, as shown by the process described later. When the value of the flag F is 0 (F=0), the state of charge is sufficient, and therefore, the subsidiary power supply 50 does not need to be charged. When the value of the flag F is 1 (F=1), the state of charge is insufficient, and therefore, the subsidiary power supply 50 needs to be charged. When a charging/discharging control routine is started, the value of the flag F is set to "0".

When the value of the flag F is "0" (YES in step S35), the power supply control portion 62 determines whether the actual charge amount Jx is smaller than the target charge amount J* in step S36. The process in step S36 is executed to determine whether the amount of charge in the subsidiary power supply 50 is insufficient. When the actual charge amount Jx is smaller than the target charge amount J*(Jx<J*) (YES in step S36), the power supply control portion 62 determines that the amount of charge is insufficient, and sets the flag F to "1" in step S37. When the actual charge amount Jx is equal to or larger than the target charge amount J*(Jx≧J*) (NO in step S36), the power supply control portion 62 determines that the amount of charge is sufficient, and does not change the value of the flag F. Thus, the value of the flag F is maintained at "0".

When the value of the flag F is "1" in step S35 (NO in step S35), the power supply control portion 62 determines whether the actual charge amount Jx has reached a charge amount (J*+A) obtained by adding a dead zone value A (a positive value) to the target charge amount J*, in step S38. The process in step S38 is executed to determine whether the actual charge amount Jx, which has been insufficient, is sufficient. When the actual charge amount Jx is equal to or larger than the charge amount (J*+A) (Jx≧J*+A) (YES in step S38), the power supply control portion 62 determines that the actual charge amount Jx, which has been insufficient, is sufficient. Accordingly, in step S39, the power supply control portion 62 sets the value of the flag F to "0". When the actual charge amount Jx is smaller than the charge amount (J*+A) (Jx<J*+A) (NO in step S38), the power supply control portion 62 determines that the actual charge amount Jx is insufficient. Accordingly, the power supply control portion 62 does not change the value of the flag F. Thus, the value of the flag F is maintained at "1".

The dead zone value A is set so that the result of the comparison between the actual charge amount Jx and the target charge amount J* (i.e., the result of the determination as to whether the subsidiary power supply 50 needs to be charged) does not frequently fluctuate.

After the value of the flag F is set, the value of the flag F is confirmed in step S40. When the value of the flag F is "0" (NO in step S40), that is, when it is determined that the state of charge of the subsidiary power supply 50 is sufficient, the power supply control portion 62 sets the target charge/discharge current isub* to zero (isub*=0) in step S41. When the value of the flag F is "1" (YES in step S40), that is, when it is determined that the amount of charge in the subsidiary power supply 50 is insufficient, the power supply control portion 62 calculates the target charge/discharge current isub* according to the following equation, in step S42. isub*=(Wlim−Wx)/v2.

In the equation, Wlim is allowable output electric power of the voltage-boosting circuit 40; Wx is electric power consumed in the motor drive circuit 30; and v2 is the output voltage detected by the second voltage sensor 52. The allowable output electric power Wlim is set in advance based on the specifications of the voltage-boosting circuit 40. Also, the electric power Wx consumed in the motor drive circuit 30 is calculated by multiplying the output voltage v2 detected by the second voltage sensor 52 by the motor current iuvw detected by the motor current sensor 38. Accordingly, the process in step S42 includes the process of reading the value of the voltage measured by the second voltage sensor 52, and the process of reading the value of the electric current measured by the motor current sensor 38. A current sensor (not shown) that measures the electric current that flows in the boosted-voltage drive line 113 may be provided, and the electric power Wx consumed in the motor drive circuit 30 may be calculated by multiplying the value of the electric current detected by the current sensor, by the output voltage v2 detected by the second voltage sensor 52.

Subsequently, in step S43, the power supply control portion 62 determines whether the target charge/discharge current isub* is a positive value. As described above, the target charge/discharge current isub* is calculated by obtaining a value by subtracting the electric power Wx consumed in the motor drive circuit 30 from the allowable output electric power Wlim of the voltage-boosting circuit 40, and dividing the obtained value by the output voltage v2. Accordingly, when the electric power Wx consumed by the electric motor 20 is smaller than the allowable output electric power Wlim of the voltage-boosting circuit 40, the target charge/discharge current isub* is larger than 0 (isub*>0) (YES in step S43). When the electric power Wx consumed in the motor drive circuit 30 is equal to or larger than the allowable output electric power Wlim of the voltage-boosting circuit 40, the target charge/discharge current isub* is equal to or smaller than 0 (NO in step S43).

When the target charge/discharge current isub* is equal to or smaller than zero (isub*≦0), the power supply control portion 62 newly sets the target charge/discharge current isub* to zero (isub*=0), in step S41. When the target charge/discharge current isub* is a positive value (isub*>0), the power supply control portion 62 does not change the target charge/discharge current isub* calculated in step S42.

After the power supply control portion 62 sets the target charge/discharge current isub*, the power supply control portion 62 controls the boosted voltage of the voltage-boosting circuit 40 through feedback, based on the difference between the target charge/discharge current isub* and an actual charge/discharge current isub, in step S44. That is, the boosted voltage of the voltage-boosting circuit 40 is controlled to decrease the difference (isub*−isub) between the target charge/discharge current isub* and the actual charge/discharge current isub. In the embodiment, a proportional integral derivative (PID) control is executed based on the difference (isub*−isub).

The power supply control portion 62 outputs a pulse signal with a predetermined cycle to the gate of each of the first and second voltage-boosting switching elements 43 and 44 in the voltage-boosting circuit 40 to turn on/off each of the first and second voltage-boosting switching elements 43 and 44 so that the electric power supplied from the main power supply 100 is boosted. The boosted voltage is controlled by changing the duty ratio of the pulse signal.

In this case, when the target charge/discharge current isub* is a positive value (isub*>0), the boosted voltage of the voltage-boosting circuit 40 is controlled so that the electric current flows toward the subsidiary power supply 50 to charge the subsidiary power supply 50, and the electric current is equal to the target charge/discharge current isub*. Accordingly, the boosted voltage of the voltage-boosting circuit 40 is controlled to be higher than the voltage of the subsidiary power supply 50. That is, when the actual charge amount Jx is smaller than the target charge amount J*, and the electric power output from the voltage-boosting circuit 40 is larger than the electric power consumed in the motor drive circuit 30, the subsidiary power supply 50 is charged with the electric power from the main power supply 100 via the voltage-boosting circuit 40. Further, the target charge/discharge current isub* is set so that the supply of the electric power to the motor drive circuit 30 is ensured, and the subsidiary power supply 50 is charged by making full use of the power supply ability of the voltage-boosting circuit 40. Therefore, the subsidiary power supply 50 is quickly charged.

When the target charge/discharge current isub* is set to zero (isub*=0), the boosted voltage of the voltage-boosting circuit 40 is controlled so that neither the charge current nor the discharge current flows to/from the subsidiary power supply 50. Accordingly, the boosted voltage of the voltage-boosting circuit 40 is controlled to the voltage that is equal to the voltage of the subsidiary power supply 50. Therefore, the subsidiary power supply 50 is not charged. Also, the boosted voltage is maintained so that the discharge current does not flow from the subsidiary power supply 50, as long as the electric power consumed in the motor drive circuit 30 does not exceed the upper limit of the electric power that can be output from the voltage-boosting circuit 40. Thus, the motor drive circuit 30 is operated using only the electric power output from the voltage-boosting circuit 40. When the electric power consumed in the motor drive circuit 30 exceeds the upper limit of the electric power that can be output from the voltage-boosting circuit 40, it is not possible to maintain the discharge current from the subsidiary power supply 50 at zero, and as a result, the boosted voltage decreases, regardless of the control of the boosted voltage of the voltage-boosting circuit 40. Thus, the electric power is supplied from the subsidiary power source 50 to the motor drive circuit 30 to compensate for the shortage of the electric power. That is, when the electric power consumed in the motor drive circuit 30 is equal to or smaller than the upper limit of the electric power that can be output from the voltage-boosting circuit 40, the electric power in the subsidiary power supply 50 is not used. Only when the required electric power is larger than the upper limit of the electric power that can be output from the voltage-boosting circuit 40, the electric power is supplied from the main power supply 100 and the subsidiary power supply 50 to the motor drive circuit 30.

Subsequently, in step S45, the power supply control portion 62 determines whether the actual charge/discharge current isub detected by the charge/discharge current sensor 53 is zero (isub=0). When the actual charge/discharge current isub is zero (YES in step S45), a duty ratio D0 of the second voltage-boosting switching element 44 in the voltage-boosting circuit 40 at the time point is stored to update the duty ratio D0. Because the control routine is executed in the predetermined cycle, and repeatedly executed, the latest duty ratio D0 is stored when the actual charge/discharge current isub is zero, in step S46. The duty ratio D0 is used in the voltage change suppression control described later.

When the actual charge/discharge current isub is zero (isub=0), the voltage of the subsidiary power supply 50 is equal to the boosted voltage of the voltage-boosting circuit 40. Accordingly, when the boosted voltage of the voltage-boosting circuit 40 is increased from this state, the charge current flows from the voltage-boosting circuit 40 to the subsidiary power supply 50. When the boosted voltage is decreased from this state, the discharge current flows from the subsidiary power supply 50 to the motor drive circuit 30. That is, the state where the voltage of the subsidiary power supply 50 is equal to the boosted voltage of the voltage-boosting circuit 40 is a boundary state. Switching between charging and discharging of the subsidiary power supply 50 is performed by controlling the boosted voltage of the voltage-boosting circuit 40, with respect to the boundary state. Thus, it is possible to control the switching between the charging and discharging of the subsidiary power supply 50, and the amount of the charge/discharge current, by using, as a reference voltage, the boosted voltage of the voltage-boosting circuit 40 when the boosted voltage of the voltage-boosting circuit 40 is equal to the voltage of the subsidiary power supply 50, and increasing the target boosted voltage of the voltage-boosting circuit 40 to a value higher than the reference voltage, or decreasing the target boosted voltage of the voltage-boosting circuit 40 to a value lower than the reference voltage.

In the embodiment, the duty ratio D0 of the second voltage-boosting switching element 44 is stored as the reference voltage. In the voltage change suppression control, the boosted voltage of the voltage-boosting circuit 40 is controlled by increasing/decreasing the duty ratio of the second voltage-boosting switching element 44 with respect to the duty ratio D0. The first voltage-boosting switching element 43 and the second voltage-boosting switching element 44 are controlled so that when the first voltage-boosting switching element 43 is on, the second voltage-boosting switching element 44 is off, and when the first voltage-boosting switching element 43 is off, the second voltage-boosting switching element 44 is on. Therefore, in step S46, the duty ratio of the first voltage-boosting switching element 43 may be stored to update the duty ratio of the first voltage-boosting switching element 43. Hereinafter, the duty ratio D0 that is stored to update the duty ratio D0 in step S46 will be referred to as "reference duty ratio".

When the reference duty ratio D0 is stored to update the reference duty ratio D0 in step S46, or when the actual charge/discharge current isub is not zero in step S45, the stable-time boosted voltage control routine ends.

In the embodiment, when the ignition switch 106 is turned off, a control (FIG. 10) that discharges the electric charge in the subsidiary power supply 50 to the main battery 101 is executed, as described later. Accordingly, when the vehicle is started, the actual charge amount Jx is smaller than the target charge amount J*. Therefore, when the boosted voltage control routine is started, an affirmative determination is made in step S36 (YES in step S36), and the value of the flag F is set to "1". Accordingly, the subsidiary power supply 50 is charged with the electric power output from the voltage-boosting circuit 40, as long as the electric power consumed in the motor drive circuit 30 is smaller than the allowable output electric power of the voltage-boosting circuit 40.

When the stable-time boosted voltage control routine is being executed, the state of charge of the subsidiary power supply 50 is repeatedly determined. This charging/discharging control increases the amount of charge in the subsidiary power supply 50. When the detected actual charge amount Jx reaches the charge amount obtained by adding the dead zone value A to the target charge amount J* (YES in step S38), the value of the flag F is set to "0" (S39), and the target charge/discharge current isub* is set to zero.

When the value of the flag F is set to "0", the subsidiary power supply 50 does not need to be charged, and thus, the boosted voltage of the voltage-boosting circuit 40 is controlled through feedback while the target charge/discharge current isub* is set to zero.

When the actual charge amount Jx in the subsidiary power supply 50 is smaller than the target charge amount J* after it is determined that the subsidiary power supply 50 does not need to be charged, the value of the flag F is changed to "1".

In this case, if the electric power output from the voltage-boosting circuit 40 is larger than the electric power consumed in the motor drive circuit 30, the target charge/discharge current isub* is set to a positive value, and the subsidiary power supply 50 is charged with the excess electric power, that is, the electric power that is not consumed in the motor drive circuit 30. If the electric power output from the voltage-boosting circuit 40 is equal to or smaller than the electric power consumed in the motor drive circuit 30, the target charge/discharge current isub* is set to zero. Thus, the charging of the subsidiary power supply 50 is restricted, and the electric power is supplied from the subsidiary power supply 50 to compensate for the shortfall of the electric power.

Figure 7:
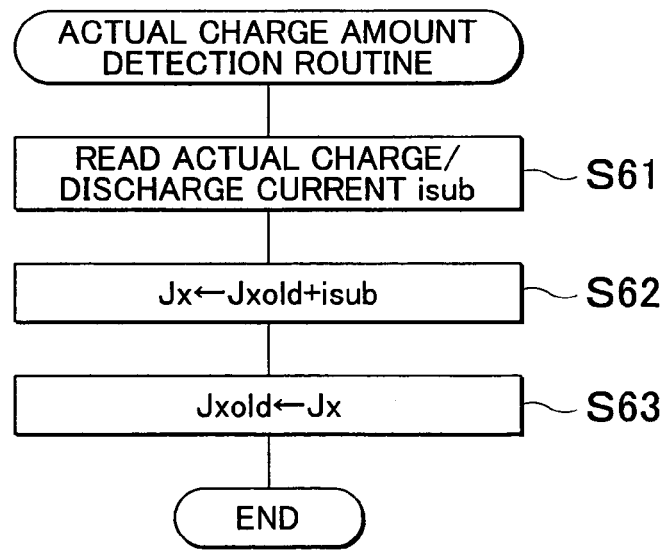
FIG. 7 is a flowchart showing an actual charge amount detection routine.

Next, the actual charge amount detection routine will be described. FIG. 7 shows the actual charge amount detection routine executed by the power supply control portion 62. The actual charge amount detection routine in the form of a control program is stored in the ROM of the electronic control unit 60. When the ignition switch 106 is turned on, the actual charge amount detection routine is started. The actual charge amount detection routine is executed in a predetermined short cycle, and repeatedly executed. The actual charge amount detected by the actual charge amount detection routine is the actual charge amount Jx read in step S31.

When the actual charge amount detection routine is started, in step S61, the power supply control portion 62 reads the actual charge/discharge current isub detected by the charge/discharge current sensor 53. Subsequently, in step S62, the actual charge amount Jx at the current time point is calculated according to the following equation. Jx=Jxold+isub. In the equation, Jxold is a preceding actual charge amount. The preceding actual charge amount is the actual charge amount Jx calculated one cycle earlier, when the actual charge amount detection routine is executed in the predetermined cycle, and repeatedly executed.

In the embodiment, when the ignition switch 106 is turned off, the electric charge in the subsidiary power supply 50 is discharged to the main battery 101. Therefore, when the actual charge amount detection routine is started, the actual charge amount Jx in the subsidiary power supply 50 is a low value that is substantially constant. Accordingly, as the initial value of the preceding actual charge amount Jxold, a fixed value that is set in advance (for example, Jxold=0) is used.

Subsequently, in step S63, the power supply control portion 62 stores the actual charge amount Jx at the current time point in the RAM as the preceding actual charge amount Jxold. Then, the actual charge amount detection routine ends. The actual charge amount detection routine is executed in the predetermined short cycle, and repeatedly executed. Accordingly, the actual charge amount Jx calculated in the current cycle is used as the preceding actual charge amount Jxold in step S62 in the next cycle (one cycle later).

The power supply control portion 62 repeatedly executes the routine during the period in which the ignition switch 106 is on. Thus, the actual charge amount Jx is determined by accumulating the values of the actual charge/discharge current isub. In this case, when the charge current flows, the values of the charge/discharge current isub are accumulated to increase the actual charge amount Jx. When the discharge current flows, the values of the charge/discharge current isub are accumulated to decrease the actual charge amount Jx. Accordingly, it is possible to appropriately detect the amount of charge in the subsidiary power supply 50.

Figure 8:
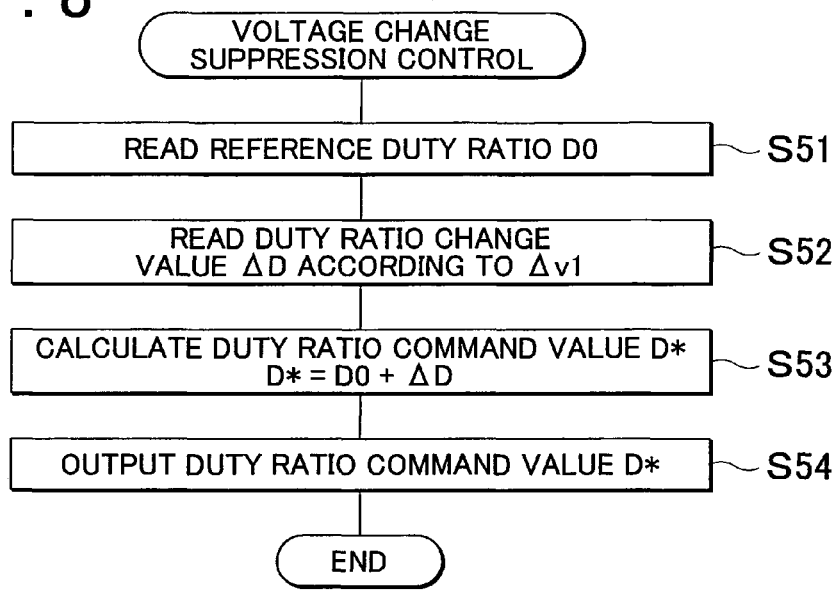
FIG. 8 is a flowchart showing a voltage change suppression control routine.

Next, the voltage change suppression control executed in step S50 will be described. FIG. 8 is a flowchart showing the voltage change suppression control routine. As described above, the voltage change suppression control routine is executed, when the absolute value of the change value, by which the main power supply voltage v1 changes per unit time (the voltage change value $\Delta v1$), exceeds the reference value B.

First, in step S51, the power supply control portion 62 reads the reference duty ratio D0. The reference duty ratio D0 is the duty ratio stored in step S46 during the stable-time boosted voltage control. That is, the reference duty ratio D0 is the duty ratio of the second voltage-boosting switching element 44 when the boosted voltage of the voltage-boosting circuit 40 is equal to the voltage of the subsidiary power supply 50. Accordingly, it is possible to control the switching between the charging/discharging of the subsidiary power supply 50, and the amount of the electric current, by changing the boosted voltage of the voltage-boosting circuit 40 by increasing/decreasing the duty ratio of the second voltage-boosting switching element 44 with respect to the duty ratio D0.

Next, in step S52, the power supply control portion 62 sets a duty ratio change value $\Delta D$ according to the voltage change value $\Delta v1$. The duty ratio change value $\Delta D$ is set with reference to a duty ratio change value setting table shown in FIG. 9. The duty ratio change value setting table is stored together with the control program in the memory of the electronic control unit 60, such as the ROM. The absolute value of the duty ratio change value $\Delta D$ is set to increase as the absolute value of the voltage change value $\Delta v1$ increases. That is, when the voltage change value $\Delta v1$ is a positive value, and therefore, the main power supply voltage v1 increases, and an increase value $|\Delta v1|$, by which the main power supply voltage v1 increases, exceeds the reference value B, the duty ratio change value $\Delta D$ is set to a positive value, and set to increase as the increase change value $|\Delta v1|$ increases. When the voltage change value $\Delta v1$ is a negative value, and therefore, the main power supply voltage v1 decreases, and a decrease value $|\Delta v1|$, by which the main power supply voltage v1 decreases, exceeds the reference value B, the duty ratio change value $\Delta D$ is set to a negative value, and set to decrease as the decrease value $|\Delta v1|$ increases.

Subsequently, in step S53, the power supply control portion 62 calculates a duty ratio command value D* that indicates the on-period ratio of the second voltage-boosting switching element 44 according to the following equation. $D^* = D0 + \Delta D$. Then, in step S54, the power supply control portion 62 outputs the PWM signal corresponding to the duty ratio command value D*, to each of the switching elements 43 and 44 in the voltage-boosting circuit 40. Then, the voltage change suppression control routine ends.

In the voltage change suppression control routine, when the output voltage v1 of the main power supply 100 increases, as the increase value increases, the on-duty ratio of the second voltage-boosting switching element 44 is increased (the on-duty ratio of the first voltage-boosting switching element 43 is decreased) to increase the target boosted voltage of the voltage-boosting circuit 40. When the output voltage v1 of the main power supply 100 decreases, as the decrease value $|\Delta v1|$ increases, the on-duty ratio of the second voltage-boosting switching element 44 is decreased (the on-duty ratio of the first voltage-boosting switching element 43 is increased) to decrease the target boosted voltage of the voltage-boosting circuit 40.

Thus, when large electric power is consumed due to the operation of the electric power steering, the power supply control portion 62 controls the boosted voltage of the voltage-boosting circuit 40 based on the degree of change in the output voltage of the main power supply 100. Therefore, it is possible to suppress a sharp change in the output voltage of the main power supply 100. For example, when the decrease in the main power supply voltage v1 is detected, the boosted voltage of the voltage-boosting circuit 40 is decreased according to the decrease value. Therefore, the boosted voltage is reliably made lower than the output voltage of the subsidiary power supply 50, and thus, the amount of the electric power supplied from the subsidiary power supply 50 to the motor drive circuit 30 is quickly increased. Accordingly, it is possible to suppress a sharp decrease in the output voltage of the main power supply 100.

Also, when the increase in the main power supply voltage v1 is detected due to a sharp decrease in the amount of the electric power consumed by the electric power steering, the power supply control portion 62 increases the boosted voltage of the voltage-boosting circuit 40 according to the increase value. Therefore, the boosted voltage is reliably made higher than the output voltage of the subsidiary power supply 50, and thus, the subsidiary power supply 50 is charged with the electric power supplied from the voltage-boosting circuit 40, and the electric power is supplied from the voltage-boosting circuit 40 to the motor drive circuit 30. Accordingly, it is possible to suppress a sharp increase in the output voltage of the main power supply 100.

Figure 9:
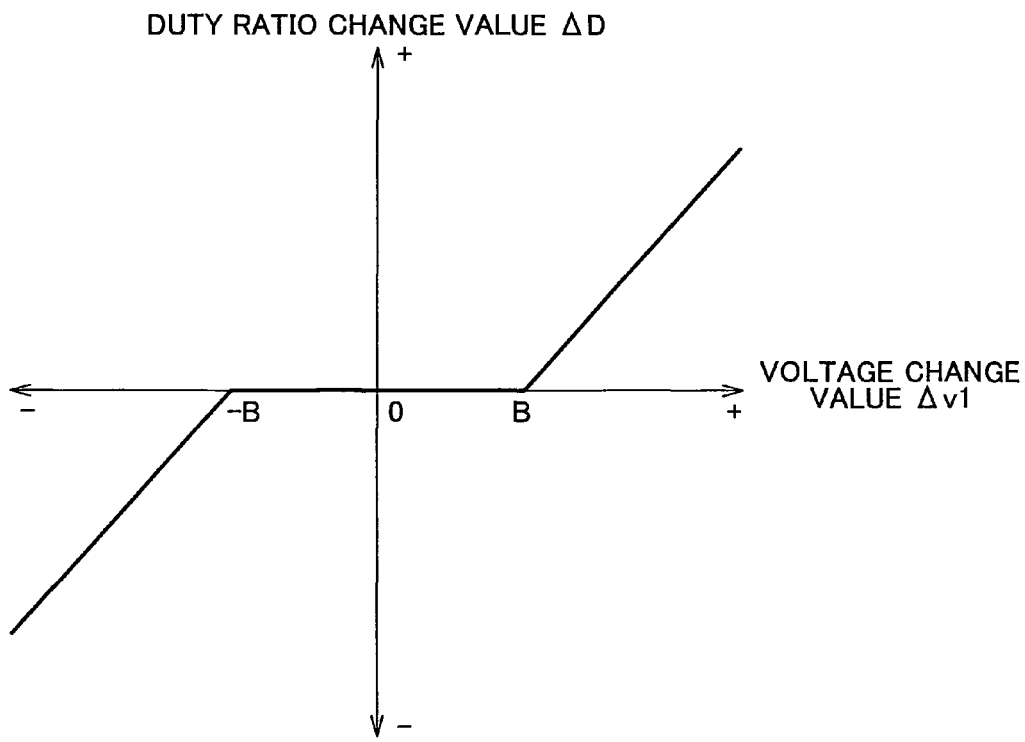
FIG. 9 is a graph showing a duty ratio change value setting table.

Further, as shown in the duty ratio change value setting table in FIG. 9, the amount of change in the boosted voltage of the voltage-boosting circuit 40 is set according to the voltage change value $\Delta v1$. Therefore, the subsidiary power supply 50 is charged with an appropriate amount of electric power, and an appropriate amount of electric power is discharged from the subsidiary power supply 50. As a result, when the electric power steering is operated, the electric power is stably supplied to the other vehicle-mounted electric loads R, and the other vehicle-mounted electric loads R are stably operated. Accordingly, for example, it is possible to suppress flickering of the headlight.

The discharging control that discharges the electric charges from the subsidiary power supply 50 will be described. In the case where a capacitor is used as the subsidiary power supply 50, the lifetime of the subsidiary power supply 50 is increased by discharging the electric charge when the subsidiary power supply 50 is not used for a long time. Also, when the actual charge amount Jx in the subsidiary power supply 50 is detected based on the value obtained by accumulating the values of the charge/discharge current isub, it is difficult to estimate the initial value of the amount of charge when the vehicle is started. Accordingly, in the embodiment, when the ignition switch 106 is turned off, the electric charge in the subsidiary power supply 50 is discharged to the main battery 101 via the voltage-boosting circuit 40. Hereinafter, the control process will be described with reference to FIG. 10.

Figure 10:
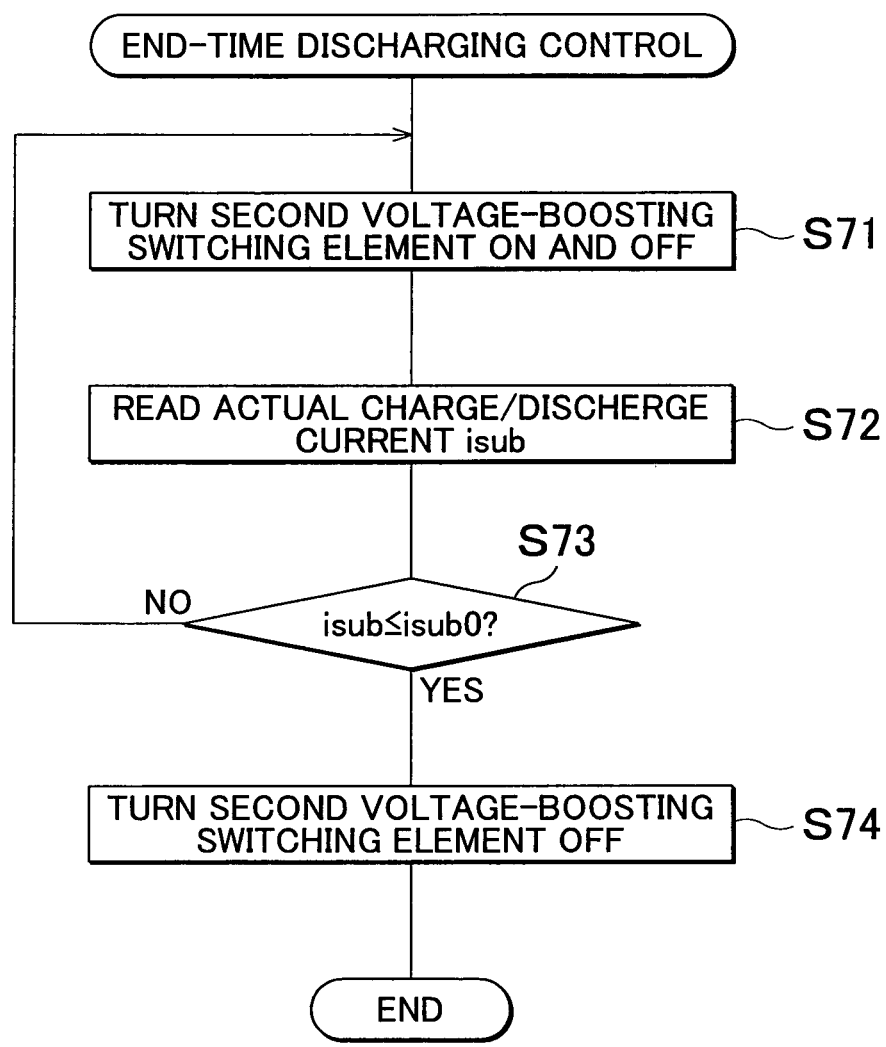
FIG. 10 is a flowchart showing an end-time discharging control routine.

FIG. 10 shows an end-time discharging control routine executed by the power supply control portion 62. The end-time discharging control routine in the form of a control program is stored in the ROM of the electronic control unit 60. When it is detected that the ignition switch 106 is turned off, the end-time discharging control routine is started. When the end-time discharging control routine is started, in step S71, the power supply control portion 62 outputs a pulse signal with a predetermined cycle to the gate of the second voltage-boosting switching element 44 in the voltage-boosting circuit 40, to turn on/off the second voltage-boosting switching element 44 at a predetermined duty ratio. Because the steering assist control ends during the period in which the ignition switch 106 is off, each of the switching elements 31 to 36 in the motor drive circuit 30 is maintained in the off state. Accordingly, the electric charge in the subsidiary power supply 50 is discharged to the main battery 101. In this case, it is possible to limit the value of the discharge current that flows from the subsidiary power supply 50 to the main battery 101, by appropriately setting the duty ratio of the second voltage-boosting switching element 44. The first voltage-boosting switching element 43 is maintained in the off state.

Subsequently, in step S72, the power supply control portion 62 reads the charge/discharge current isub (the value of the electric current that flows in a direction from the subsidiary power supply 50 to the main battery 101) measured by the charge/discharge current sensor 53. In step S73, it is determined whether the charge/discharge current isub is equal to or smaller than a discharge stop determination current isub0. For example, the discharge stop determination current isub0 is set to 0 ampere.

When the charge/discharge current isub is larger than the discharge stop determination current isub0, the processes in steps S71 to S73 are repeated. During this period, the electric charge continues to be discharged from the subsidiary power supply 50 to the main battery 101. When the charge/discharge current isub is equal to or smaller than the discharge stop determination current isub0 (for example, when the discharge current stops flowing), the second voltage-boosting switching element 44 is turned off in step S74, and the end-time discharging control routine ends.

Accordingly, by executing the end-time discharging control routine, the lifetime of the subsidiary power supply 50 is increased. Also, after the ignition switch 106 is turned on, it is possible to accurately detect the actual charge amount. That is, the actual charge amount is calculated by accumulating the values of the charge/discharge current that flows to/from the subsidiary power supply 50, and it is difficult to estimate the initial value of the amount of charge at the start time. Thus, the actual charge amount detection routine is executed after the electric charge is discharged from the subsidiary power supply 50. This suppresses a detection error due to variation in the initial value of the amount of charge. The voltage-boosting circuit 40 is also used to control the value of the discharge current that flows to the main battery 101. Therefore, a specific circuit used to control the discharge current does not need to be provided. Therefore, it is possible to suppress an increase in the cost.

In the embodiment that has been described, when large electric power is consumed due to the operation of the electric power steering apparatus, the change in the voltage output form the main power supply 100 is suppressed by executing the voltage change suppression control. Therefore, it is possible to stabilize the operations of the other vehicle-mounted electric loads R. For example, when the change value $|\Delta v1|$, by which the output voltage v1 of the main power supply 100 changes per unit time, exceeds the reference value B, and the output voltage v1 of the main power supply 100 decreases, the output voltage of the subsidiary power supply 50 is made higher than the boosted voltage of the voltage-boosting circuit 40 by decreasing the target boosted voltage of the voltage-boosting circuit 40. In other words, the boosted voltage of the voltage-boosting circuit is made lower than the output voltage of the subsidiary power supply 50. Thus, the electric power is quickly supplied from the subsidiary power supply 50 to the motor drive circuit 30. Accordingly, it is possible to suppress a sharp decrease in the voltage of the main power supply 100.

Also, when the change value $|\Delta v1|$, by which the output voltage v1 of the main power supply 100 changes per unit time, exceeds the reference value B, and the output voltage v1 of the main power supply 100 increases, the boosted voltage of the voltage-boosting circuit 40 is made higher than the output voltage of the subsidiary power supply 50, by increasing the target boosted voltage of the voltage-boosting circuit 40. Thus, the subsidiary power supply 50 is quickly charged with the electric power supplied from the main power supply 100, and the electric power is supplied from the main power supply 100 to the motor drive circuit 30. Accordingly, it is possible to suppress a sharp increase in the voltage of the main power supply 100.

When the boosted voltage of the voltage-boosting circuit 40 is controlled, the boosted voltage of the voltage-boosting circuit 40 when the boosted voltage of the voltage-boosting circuit 40 is equal to the output voltage of the subsidiary power supply 50 is used as the reference voltage, and the boosted voltage is changed with respect to the reference voltage (that is, the boosted voltage is increased to a value higher than the reference voltage or decreased to a value lower than the reference voltage). Therefore, it is possible to reliably change the magnitude relation between the boosted voltage of the voltage-boosting circuit 40 and the output voltage of the subsidiary power supply 50. For example, in the embodiment, the voltage-boosting circuit 40 is provided, and the boosted voltage of the voltage-boosting circuit 40 is controlled by changing the duty ratio of each switching element. The duty ratio of the switching element when the boosted voltage of the voltage-boosting circuit 40 is equal to the output voltage of the subsidiary power supply 50 is stored as the reference duty ratio D0. The boosted voltage is adjusted by adding the duty ratio change value ΔD to the reference duty ratio D0. Accordingly, it is possible to reliably change the magnitude relation between the boosted voltage of the voltage-boosting circuit 40 and the output voltage of the subsidiary power supply 50.

Further, the boosted voltage of the voltage-boosting circuit 40 is increased/decreased by the change amount (the duty ratio change value ΔD) that is set according to the change value $|\Delta v1|$ by which the output voltage v1 of the main power supply 100 changes per unit time. Therefore, the subsidiary power supply 50 is charged with an appropriate amount of electric power and an appropriate amount of electric power is discharged from the main power supply 100 according to the degree of the change in the voltage of the main power supply 100.

As a result, when large electric power is consumed due to the operation of the electric power steering, it is possible to suppress a sharp change in the output voltage of the main power supply 100, and to stabilize the supply of electric power to the other vehicle-mounted electric loads R. Accordingly, the other vehicle-mounted electric loads R are stably operated, and for example, flickering of the headlight is suppressed. Therefore, the driver does not feel discomfort.

Also, when the degree of the change in the output voltage of the main power supply 100 is small, the boosted voltage of the voltage-boosting circuit 40 is controlled through feedback based on the difference between the target charge/discharge current isub* and the actual charge/discharge current isub, by the stable-time boosted voltage control (S30). Therefore, it is possible to easily control the state of charge of the subsidiary power supply 50. Further, the target charge/discharge current isub* is set based on the magnitude relation between the actual charge amount Jx and the target charge amount J*, and the ability of the voltage-boosting circuit 40 to supply electric power with respect to the electric power consumed in the voltage-boosting circuit 40. Therefore, it is possible to suppress excessive charging/discharging of the subsidiary power supply 50.

For example, when it is determined that the amount of charge in the subsidiary power supply 50 is sufficient (flag F=0), the target charge/discharge current isub* is set to zero (isub*=0). Therefore, it is possible to restrict the charging of the subsidiary power supply 50, and to reduce the possibility that the subsidiary power supply 50 is overcharged. This increases the lifetime of the subsidiary power supply 50. Also, the supply of electric power from the subsidiary power supply 50 is stopped, as long as the electric power consumed in the motor drive circuit 30 does not exceed the upper limit of the electric power that can be output from the voltage-boosting circuit 40. Only when the electric power consumed in the motor drive circuit 30 exceeds the upper limit of the electric power that can be output from the voltage-boosting circuit 40, the electric power is supplied from the subsidiary power supply 50 to compensate for the shortage of the electric power. Therefore, it is possible to minimize the use of the electric power in the subsidiary power supply 50. Thus, the electric power is stored in the subsidiary power supply 50 so that the electric power in the subsidiary power supply 50 is used when large electric power is consumed. Accordingly, it is possible to appropriately execute the steering assist control. Further, when the motor drive circuit 30 does not need electric power, it is possible to stop the voltage-boosting operation of the voltage-boosting circuit 40, and to suppress consumption of the energy required for the voltage-boosting operation.

When the actual charge amount Jx is smaller than the target charge amount J*(flag F=1), and the electric power output from the voltage-boosting circuit 40 is larger than the electric power consumed in the motor drive circuit 30, the target charge/discharge current isub* is set to a positive value, and the subsidiary power supply 50 is charged with the electric power supplied from the main power supply 100 via the voltage-boosting circuit 40. In other words, when the actual charge amount Jx in the subsidiary power supply 50 is smaller than the target charge amount J*, and the allowable output electric power of the voltage-boosting circuit 40 is larger than the electric power consumed in the motor drive circuit 30, the boosted voltage of the voltage-boosting circuit 40 is controlled so that the subsidiary power supply 50 is charged. In this case, the target charge/discharge current isub* is set so that the that the supply of the electric power to the motor drive circuit 30 is ensured, and the subsidiary power supply 50 is charged by making full use of the power supply ability of the voltage-boosting circuit 40. Therefore, the subsidiary power supply 50 is quickly charged.

Even when the actual charge amount Jx is smaller than the target charge amount J*(flag F=1), if the electric power output from the voltage-boosting circuit 40 is equal to or smaller than the electric power consumed in the motor drive circuit 30, the target charge/discharge current isub* is set to zero (isub*=0). In other words, even when the actual charge amount Jx in the subsidiary power supply 50 is smaller than the target charge amount J*, if the allowable output electric power of the voltage-boosting circuit 40 is equal to or smaller than the electric power consumed in the motor drive circuit 30, the boosted voltage of the voltage-boosting circuit 40 is controlled so that the charging of the subsidiary power supply 50 is restricted. Accordingly, the charging of the subsidiary power supply 50 is restricted, and the electric power is supplied from the subsidiary power supply 50 to the motor drive circuit 30 to compensate for the shortage of the electric power. Thus, it is possible to supply the electric power to the motor drive circuit 30, and to suppress the consumption of the electric power in the subsidiary power supply 50.

Further, the target charge amount J* is set to decrease as the vehicle speed increases. Therefore, when it is predicted that large electric power will be consumed, the amount of charge in the subsidiary power supply 50 is increased to increase the ability of the subsidiary power supply 50 to assist the supply of electric power. When it is not predicted that large electric power will be consumed, the charging of the subsidiary power supply 50 is suppressed to increase the lifetime of the subsidiary power supply 50.

When the actual charge amount Jx in the subsidiary power supply 50 is compared with the target charge amount J*, a dead zone is set. Therefore, it is possible to suppress a hunting phenomenon in which charging and discharging are frequently repeated. This further increases the lifetime of the subsidiary power supply 50.

As the power supply apparatus for the electric power steering apparatus, the main power supply 100 and the subsidiary power supply 50 are used to provide the sufficient steering assist performance. Therefore, it is possible to suppress an increase in the capacity of the main power supply 100. Also, the electric motor 20 is efficiently driven using the voltage-boosting circuit 40. Further, the voltage-boosting circuit 40 is also used to control the charging/discharging of the subsidiary power supply 50. Therefore, the configuration of the circuit is not complicated, and an increase in the cost is suppressed. For example, a switching circuit or a switch used to switch between charging and discharging is not required.

Even if the boosted voltage of the voltage-boosting circuit 40 fluctuates due to the charging/discharging control for the subsidiary power supply 50, it is possible to appropriately control the operation of the electric motor 20, because the assist control portion 61 executes the PWM control for the motor drive circuit 30.

Although the electric power steering apparatus that includes the power supply apparatus according to the embodiment of the invention has been described, the invention is not limited to the above-described embodiment. Various modifications may be made without departing from the invention. For example, in the embodiment, the change amount, by which the boosted voltage is changed, is adjusted according to the voltage change value Δv1. However, the change amount, by which the boosted voltage is changed, may be a constant value. Also, in the embodiment, during the stable-time boosted voltage control, the boosted voltage of the voltage-boosting circuit 40 is controlled based on the target charge amount and the actual charge amount. However, the boosted voltage of the voltage-boosting circuit 40 may be controlled to a constant value.

Also, in the embodiment, the electronic control unit 60 includes the power supply control portion 62 that constitutes a part of the power supply apparatus, and the assist control portion 61 that constitutes a part of the electric power steering apparatus. However, the control portions 61 and 62 may be constituted by the respective microcomputers.

Also, the power supply apparatus need not necessarily be applied to the electric power steering apparatus. The power supply apparatus may be applied to various apparatuses. For example, the power supply apparatus may be applied to various apparatuses provided in the vehicle. For example, the power supply apparatus may be applied to an electrically-controlled brake apparatus, an electrically-controlled suspension apparatus, and an electrically-controlled stabilizer apparatus. Also, the power supply apparatus may be applied to a steer-by-wire steering apparatus as the steering apparatus that provides a steering force to the wheels. The steer-by-wire steering apparatus mechanically separates the steering wheel from a wheel turning shaft, and turns the wheels using only a force provided from an electric motor that is operated according to the steering operation.

The invention claimed is:

1. A power supply apparatus for a vehicle, comprising:
a main power supply that supplies electric power to a plurality of vehicle-mounted electric loads;

a voltage-boosting circuit that boosts an output voltage of the main power supply, and outputs the electric power, whose voltage is boosted, to a specific vehicle-mounted electric load among the plurality of the vehicle-mounted electric loads;

a subsidiary power supply that is connected in parallel to a circuit that connects the voltage-boosting circuit to the specific vehicle-mounted electric load, wherein the subsidiary power supply is charged with the electric power output from the voltage-boosting circuit, and the subsidiary power supply assists supply of the electric power to the specific vehicle-mounted electric load using the electric power with which the subsidiary power supply is charged;

a power supply change detection portion that detects a change in a state of the supply of the electric power from the main power supply; and a boosted-voltage control portion that controls the boosted voltage of the voltage-boosting circuit, based on the change in the state of the supply of the electric power detected by the power supply change detection portion, wherein the power supply change detection portion detects a degree of a change in the output voltage of the main power supply; and the boosted-voltage control portion decreases the boosted voltage of the voltage-boosting circuit when the change in the output voltage of the main power supply is a decrease in the output voltage of the main power supply, and a degree of the decrease is larger than a decrease threshold value.

2. A method of controlling a power supply apparatus for a vehicle, the power supply apparatus including a main power supply that supplies electric power to a plurality of vehicle-mounted electric loads; a voltage-boosting circuit that boosts an output voltage of the main power supply, and outputs the electric power, whose voltage is boosted, to a specific vehicle-mounted electric load among the plurality of the vehicle-mounted electric loads; and a subsidiary power supply that is connected in parallel to a circuit that connects the main power supply to the specific vehicle-mounted electric load, wherein the subsidiary power supply is charged with the electric power output from the voltage-boosting circuit, and the subsidiary power supply assists supply of the electric power to the specific vehicle-mounted electric load using the electric power with which the subsidiary power supply is charged, the method comprising:

detecting a degree of a change in the output voltage of the main power supply; and decreasing the boosted voltage of the voltage-boosting circuit, when the change in the output voltage of the main power supply is a decrease in the output voltage of the main power supply, and a degree of the decrease is larger than a decrease threshold value.

3. The power supply apparatus according to claim 1, wherein the boosted-voltage control portion increases the boosted voltage of the voltage-boosting circuit, when the change in the output voltage of the main power supply is an increase in the output voltage of the main power supply, and a degree of the increase is larger than an increase threshold value.

4. The power supply apparatus according to claim 3, wherein:

the boosted-voltage control portion uses a voltage equivalent to an output voltage of the subsidiary power supply as a reference voltage;

when the degree of the decrease is larger than the decrease threshold value, the boosted-voltage control portion decreases the boosted voltage of the voltage-boosting circuit to a value lower than the reference voltage; and when the degree of the increase is larger than the increase threshold value, the boosted-voltage control portion increases the boosted voltage of the voltage-boosting circuit to a value higher than the reference voltage.

5. The power supply apparatus according to claim 3, wherein:

when the degree of the decrease exceeds the decrease threshold value, the boosted-voltage control portion sets a target boosted voltage so that the target boosted voltage decreases as the degree of the decrease increases; and when the degree of the increase exceeds the increase threshold value, the boosted-voltage control portion sets the target boosted voltage so that the target boosted voltage increases as the degree of the increase increases.

6. The power supply apparatus according to claim 3, further comprising:

a charge amount detection portion that detects an amount of charge in the subsidiary power supply, wherein when the change in the output voltage of the main power supply is the increase in the output voltage of the main power supply, and the degree of the increases is equal to or smaller than the increase threshold value, the boosted-voltage control portion controls the boosted voltage of the voltage-boosting circuit, based on the amount of charge detected by the charge amount detection portion and a target amount of charge; and when the change in the output voltage of the main power supply is the decrease in the output voltage of the main power supply, and the degree of the decrease is equal to or smaller than the decrease threshold value, the boosted-voltage control portion controls the boosted voltage of the voltage-boosting circuit, based on the amount of charge detected by the charge amount detection portion and the target amount of charge.

7. The power supply apparatus according to claim 6, wherein when an actual amount of charge in the subsidiary power supply is smaller than the target amount of charge, and allowable output electric power of the voltage-boosting circuit is larger than electric power consumed by the specific vehicle-mounted electric load, the boosted-voltage control portion controls the boosted voltage of the voltage-boosting circuit so that the subsidiary power supply is charged.

8. The power supply apparatus according to claim 6, wherein when an actual amount of charge in the subsidiary power supply is smaller than the target amount of charge, and allowable output electric power of the voltage-boosting circuit is equal to or smaller than electric power consumed by the specific vehicle-mounted electric load, the boosted-voltage control portion controls the boosted voltage of the voltage-boosting circuit so that charging of the subsidiary power supply is restricted.

9. The power supply apparatus according to claim 1, wherein when the power supply apparatus is stopped, an electric charge in the subsidiary power supply is discharged to the main power supply.

10. The power supply apparatus according to claim 1, wherein the plurality of the vehicle-mounted electric loads, to which the electric power is supplied from the main power supply, includes a lighting device.

11. The power supply apparatus according to claim 1, wherein the specific vehicle-mounted electric load is a steering actuator that provides a steering force to a wheel according to a steering operation performed by a driver.

* * * * *